US012317294B2

(12) United States Patent
Sambhwani et al.

(10) Patent No.: US 12,317,294 B2
(45) Date of Patent: May 27, 2025

(54) COOPERATIVE COMMUNICATION FOR USER EQUIPMENT GROUPS

(71) Applicant: Apple Inc., Cupertino, CA (US)

(72) Inventors: Sharad Sambhwani, San Diego, CA (US); Dirk Nickisch, Oberpframmern (DE); Madhukar K Shanbhag, Santa Clara, CA (US); Rohit U Nabar, Sunnyvale, CA (US); Sanjeevi Balasubramanian, San Jose, CA (US); Shiva Krishna Narra, San Jose, CA (US); Sriram Subramanian, Santa Clara, CA (US); Tarik Tabet, San Diego, CA (US); Vishwanth Kamala Govindaraju, Mountain View, CA (US); Yakun Sun, San Jose, CA (US); Parvathanathan Subrahmanya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 17/880,613

(22) Filed: Aug. 3, 2022

(65) Prior Publication Data

US 2023/0148128 A1 May 11, 2023

Related U.S. Application Data

(60) Provisional application No. 63/278,438, filed on Nov. 11, 2021.

(51) Int. Cl.
*H04W 4/08* (2009.01)
*H04B 7/00* (2006.01)
(Continued)

(52) U.S. Cl.
CPC .......... *H04W 72/30* (2023.01); *H04L 5/0048* (2013.01); *H04L 5/0051* (2013.01); *H04W 4/08* (2013.01);
(Continued)

(58) Field of Classification Search
None
See application file for complete search history.

(56) References Cited

U.S. PATENT DOCUMENTS 6,791,904 B1 * 9/2004 Herron ................ H04L 12/2803
369/19
8,332,528 B2 * 12/2012 Mobin ............... H04N 21/4143
709/231

(Continued)

OTHER PUBLICATIONS

Ericsson, "Correction to UE capability procedures [103bis-23]", 3GPP TSG-RAN2 Meeting #104, Spokane, USA, Nov. 12, 2018, pp. 1-37.

(Continued)

*Primary Examiner* — Tuan A Tran
(74) *Attorney, Agent, or Firm* — FLETCHER YODER PC

(57) ABSTRACT

User equipment in close proximity may transfer data and control information. For example, the user equipment may exchange data or data sets between each other. Each user equipment can receive and transmit data using radio access technologies. A group of user equipments may include active user equipment and passive user equipment. Active user equipment connects with one or more base stations and transfers data on a wireless communication network via the base station. The active user equipment may communicate with other active user equipment and passive user equipment. Passive user equipment may not connect to any base station and/or the wireless communication network and may communicate with other passive user equipment and active (Continued)

user equipment (e.g., via a sidelink, peer-to-peer, or device-to-device channel).

20 Claims, 18 Drawing Sheets

(51) Int. Cl.
| | |
|---|---|
| *H04L 5/00* | (2006.01) |
| *H04W 48/12* | (2009.01) |
| *H04W 48/16* | (2009.01) |
| *H04W 56/00* | (2009.01) |
| *H04W 68/00* | (2009.01) |
| *H04W 72/30* | (2023.01) |
| *H04W 76/10* | (2018.01) |
| *H04W 76/14* | (2018.01) |
| *H04W 76/15* | (2018.01) |
| *H04W 76/19* | (2018.01) |
| *H04W 76/28* | (2018.01) |
| *H04W 76/30* | (2018.01) |
| *H04W 76/40* | (2018.01) |
| *H04W 80/04* | (2009.01) |

(52) U.S. Cl.
CPC .......... *H04W 48/12* (2013.01); *H04W 48/16* (2013.01); *H04W 56/001* (2013.01); *H04W 68/005* (2013.01); *H04W 76/10* (2018.02); *H04W 76/14* (2018.02); *H04W 76/15* (2018.02); *H04W 76/19* (2018.02); *H04W 76/30* (2018.02); *H04W 76/40* (2018.02); *H04W 80/04* (2013.01)

(56) References Cited

U.S. PATENT DOCUMENTS

| | | | | |
|---|---|---|---|---|
| 9,565,263 | B2* | 2/2017 | Lin | .......................... H04W 4/80 |
| 9,614,923 | B2* | 4/2017 | Lin | ....................... H04L 67/104 |
| 9,642,031 | B2* | 5/2017 | Han | ....................... H04W 28/02 |
| 9,686,730 | B2* | 6/2017 | Dai | ................. H04W 36/00692 |
| 9,872,318 | B2* | 1/2018 | Cheng | ................... H04W 48/10 |
| 9,921,561 | B2* | 3/2018 | Schoenberger | ....... G05B 19/042 |
| 9,999,029 | B2* | 6/2018 | Zhang | ................... H04L 1/0003 |
| 10,452,320 | B2* | 10/2019 | Schoenberger | ....... G06F 3/0683 |
| 10,667,168 | B2 | 5/2020 | Dinan | |
| 10,904,806 | B2* | 1/2021 | Hapsari | ............... H04W 36/023 |
| 10,918,235 | B2* | 2/2021 | Han | ......................... F24C 15/00 |
| 10,979,105 | B2* | 4/2021 | Hong | ................... H04B 7/0413 |
| 11,330,471 | B2 | 5/2022 | Kwok | |
| 11,412,572 | B2* | 8/2022 | Jeong | .................... H04W 80/10 |
| 11,528,745 | B2* | 12/2022 | Tejedor | ................. H04W 76/16 |
| 11,956,850 | B2* | 4/2024 | Wang | ................ H04W 36/0016 |
| 12,114,394 | B2* | 10/2024 | Wang | ................ H04W 36/0069 |
| 2005/0183120 | A1* | 8/2005 | Jain | ..................... H04N 7/17336 |
| | | | | 725/86 |
| 2005/0245256 | A1* | 11/2005 | Takeichi | ................. H04W 8/04 |
| | | | | 455/433 |
| 2006/0050736 | A1* | 3/2006 | Segel | ................. H04B 7/18591 |
| | | | | 370/542 |
| 2009/0129264 | A1* | 5/2009 | Bugenhagen | ........... H04L 47/39 |
| | | | | 370/230 |
| 2009/0164600 | A1* | 6/2009 | Issa | ..................... H04L 65/1094 |
| | | | | 709/215 |
| 2013/0132502 | A1 | 5/2013 | Stacey et al. | |
| 2013/0201830 | A1 | 8/2013 | Wang et al. | |
| 2014/0244568 | A1 | 8/2014 | Goel et al. | |
| 2016/0308776 | A1 | 10/2016 | Ozturk et al. | |
| 2020/0059962 | A1* | 2/2020 | Tejedor | ................. H04W 76/14 |
| 2020/0120522 | A1 | 4/2020 | Xiao et al. | |
| 2020/0288374 | A1 | 9/2020 | Henry et al. | |

OTHER PUBLICATIONS

Mario H. Castaneda Garcia, et al., "A Tutorial on 5G NR V2X Communications," IEEE Communications Surveys & TUTORIALS, vol. 23, No. 3, Feb. 8, 2021, pp. 1-55.

ETSI, "5G; NR; Packet Data Convergence Protocol (PDCP) specification," 3GPP TS 38.323 version 15.2.0 Release 15, Nov. 2020, pp. 1-42.

Carlos Pupiales, et al., "Capacity and Congestion Aware Flow Control Mechanism for Efficient Traffic Aggregation In Multi-Radio Dual Connectivity," IEEE Access, Digital Object Identifier 10.1109/ACCESS.2021.3105177, Aug. 16, 2021, pp. 1-16.

* cited by examiner

COOPERATIVE COMMUNICATION FOR USER EQUIPMENT GROUPS

CROSS-REFERENCE TO RELATED APPLICATIONS

This application claims priority to U.S. Provisional Application No. 63/278,438, filed Nov. 11, 2021, entitled "COOPERATIVE COORDINATION SCHEMES FOR MULTI-NODE DEVICES," the disclosure of which is hereby incorporated by reference in its entirety for all purposes.

BACKGROUND

The present disclosure relates generally to wireless communication, and more specifically to cooperative communication for user equipment in a group of user equipment.

User equipment density has increased rapidly over the years. User equipment may also support several radio access technologies (RATs) simultaneously in close proximity to one another. Moreover, with the use of high spectrum frequencies (e.g., the millimeter wave (mmW) frequency range, the terahertz (THz) frequency range), the coverage range of wireless communication networks may be limited in terms of signal loss. Additionally, communication between each user equipment and a wireless communication network may be performed through point-to-point connections without cooperation of nearby user equipment.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving, at a first user equipment of a group of user equipments, a request for data from a target user equipment, wherein the group of user equipments comprises the target user equipment. The method also includes receiving, at the first user equipment, a first set of the data from a first base station, the first base station configured to receive the first set from a server. The method also includes receiving, at the first user equipment, a second set of the data from a second base station, the first base station configured to receive the second set from the server and assembling, at the first user equipment, the data based at least in part on the first set and the second set. The method also includes transmitting, from the first user equipment, the first set, the second set, the data, or any combination thereof to the target user equipment, the target user equipment being disconnected from the first base station, the second base station, or both.

In another embodiment, a method includes receiving, at a base station, a request for data and receiving, at the base station, the data from a server. The method also includes transmitting a first set of the data to a first user equipment communicatively coupled to the base station, a group of user equipments comprising the first user equipment and transmitting a second set of the data to a second user equipment communicatively coupled to the base station, the group of user equipments comprising the second user equipment. The method also includes causing the first user equipment to send, via a device-to-device communication link, the first set of the data to a target user equipment that is disconnected from the base station, the group of user equipments comprising the target user equipment and causing the second user equipment to send, via a device-to-device communication link, the second set of the data to the target user equipment.

In yet another embodiment, a method includes receiving, at a first user equipment communicatively coupled to a base station, a first data and receiving, at the first user equipment, a first set of the data and a second set of the data. The method also includes transmitting the first set, the second set, the first data, or any combination thereof to the base station and transmitting, via device-to device communication to a second user equipment communicatively coupled to the base station, the first set, the second set, the first data, or any combination thereof. The method also includes causing the second user equipment to send the first set, the second set, the first data, or any combination thereof to the base station.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

Figure 1:
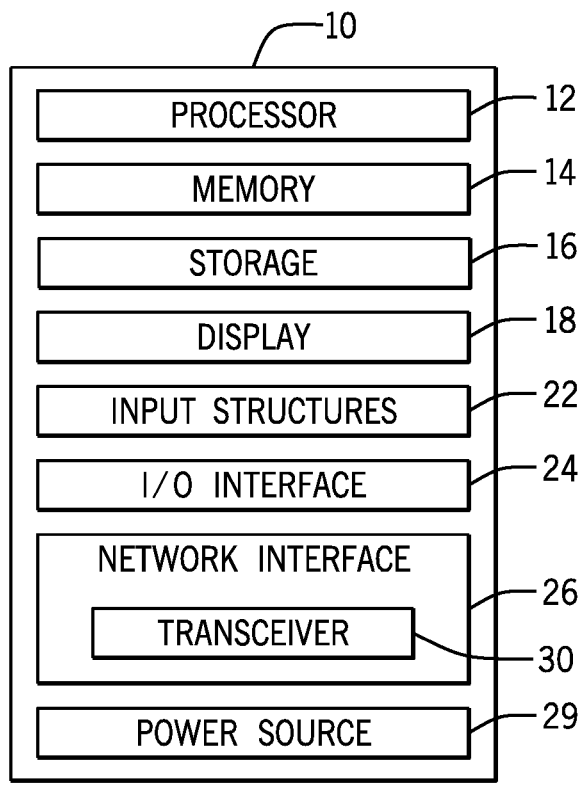
FIG. 1 is a block diagram of user equipment, according to embodiments of the present disclosure.
Figure 3:
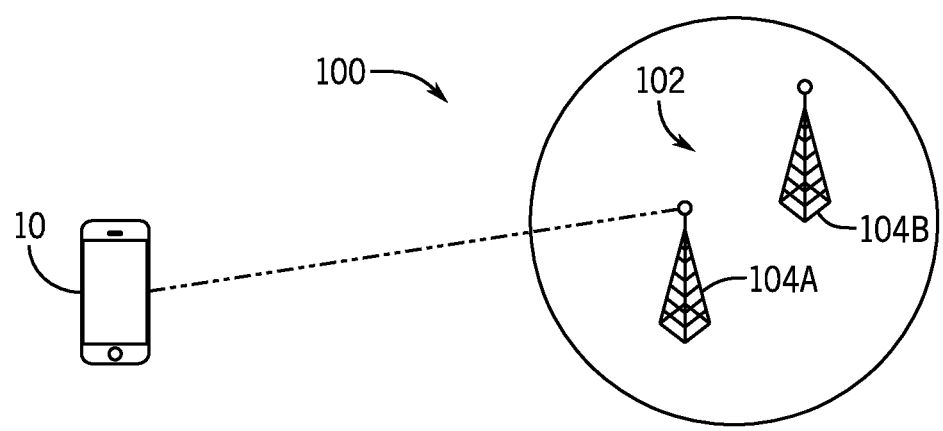
FIG. 3 is a schematic diagram of a communication system including the user equipment of FIG. 1 communicatively coupled to a wireless communication network supported by base stations, according to embodiments of the present disclosure.
Figure 4:
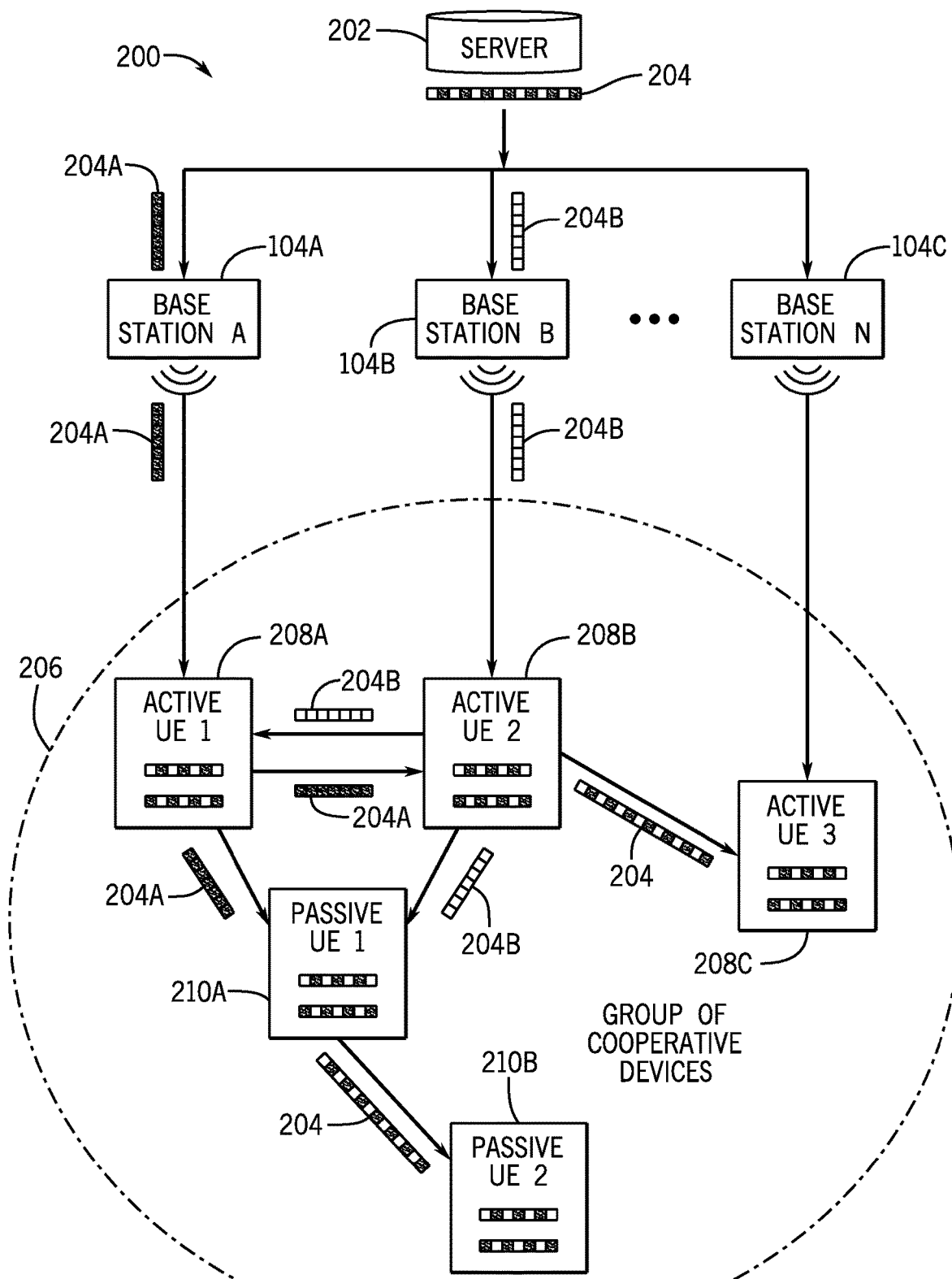
FIG. 4 is a schematic diagram of another embodiment of a communication system including a group of user equipment communicatively coupled to the wireless communication network of FIG. 3, according to embodiments of the present disclosure.
Figure 9:
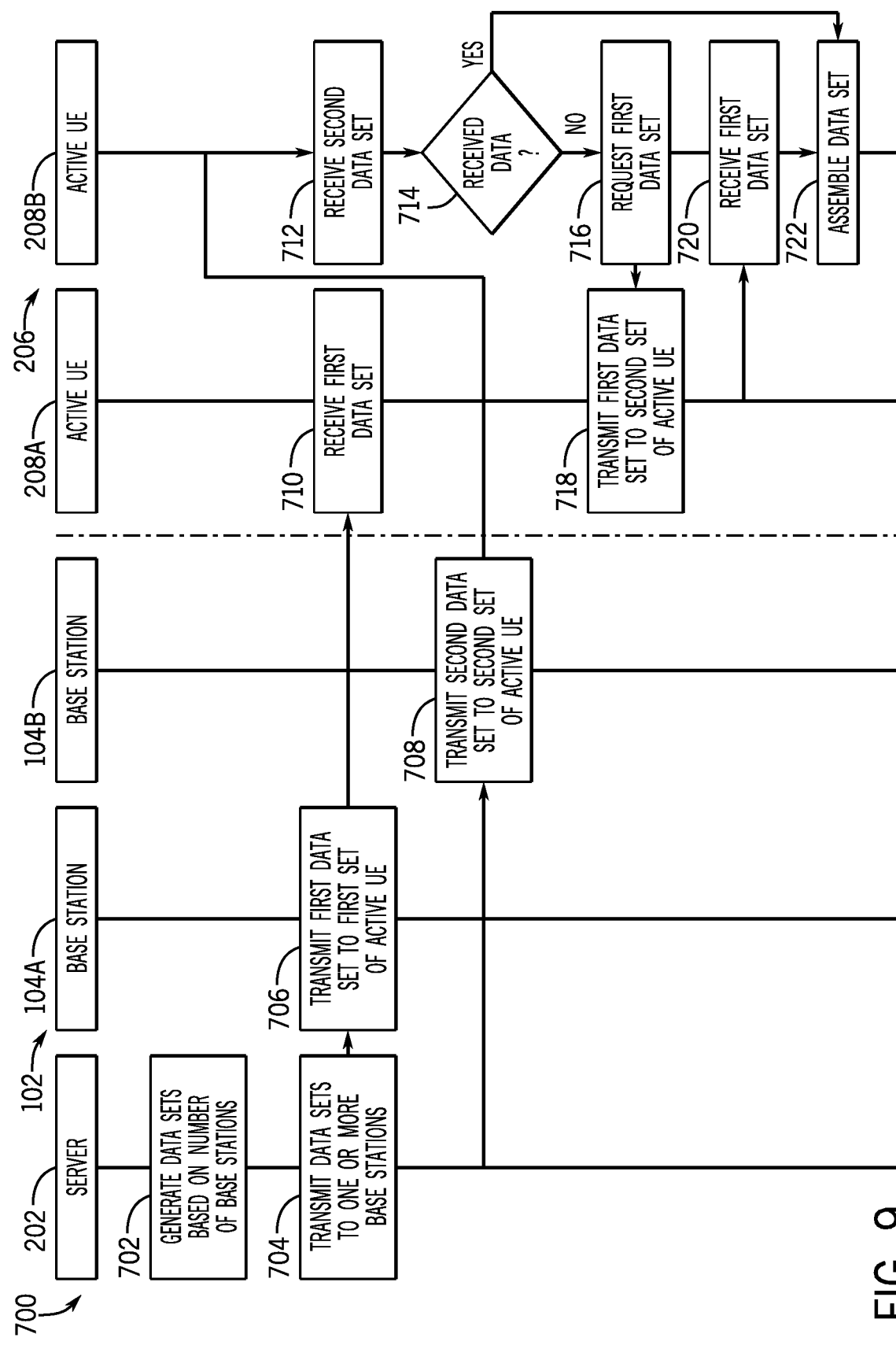
Figure 10:
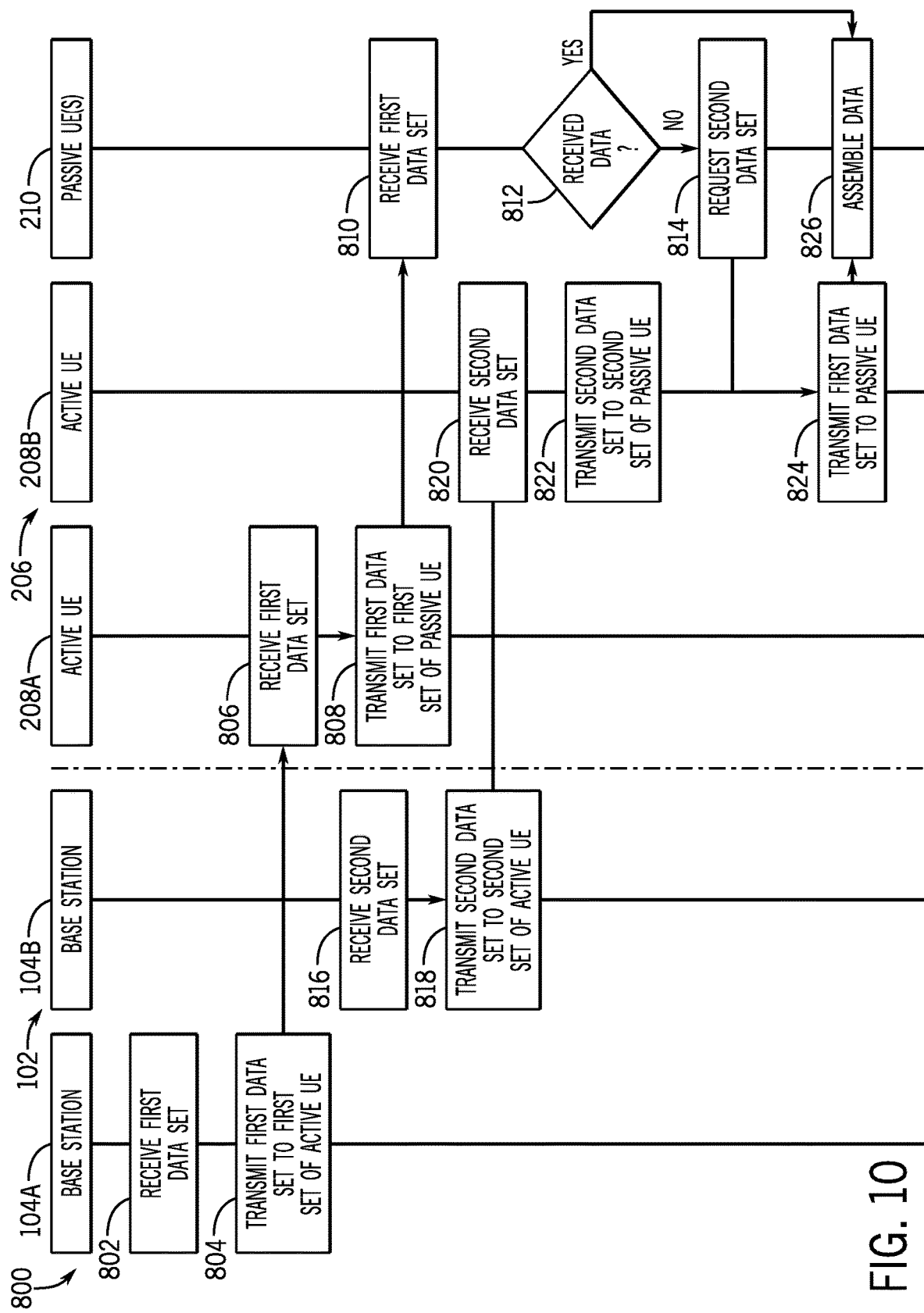
Figure 11:
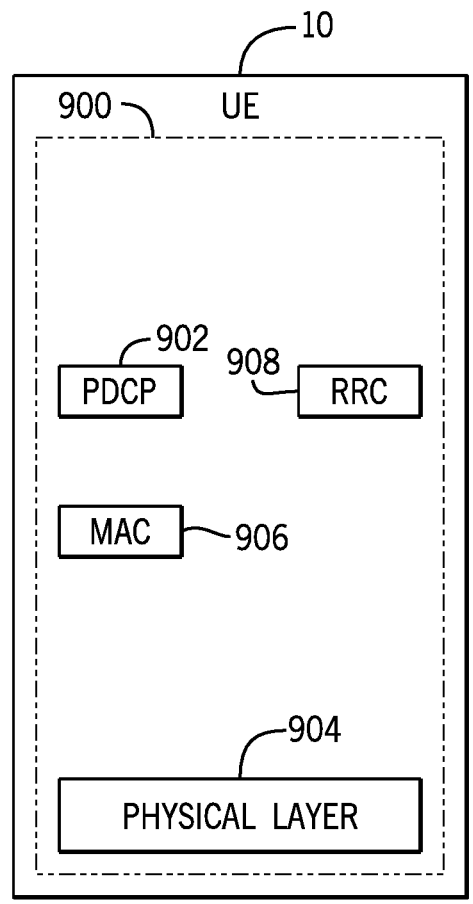
Figure 12:
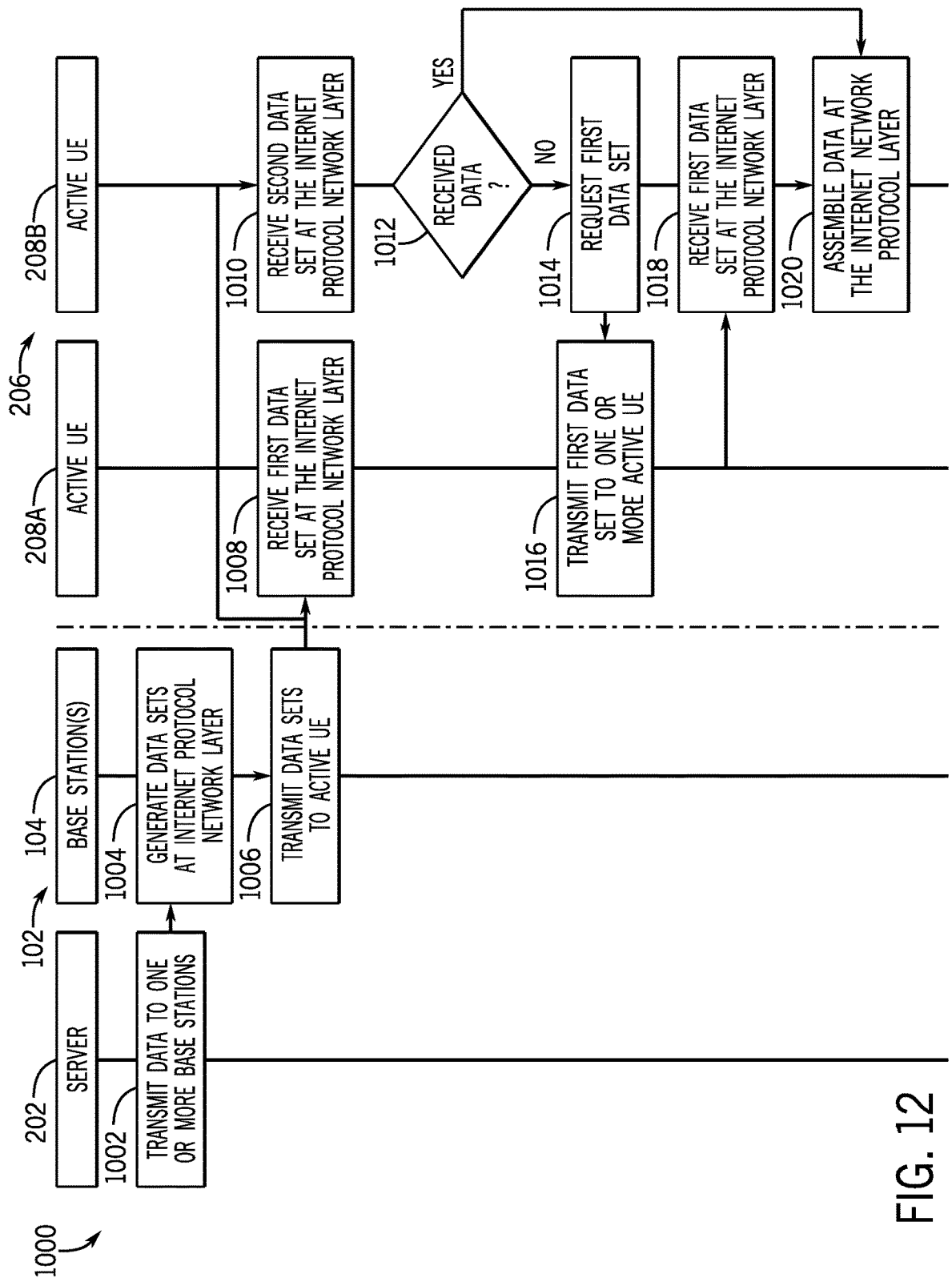
Figure 13:
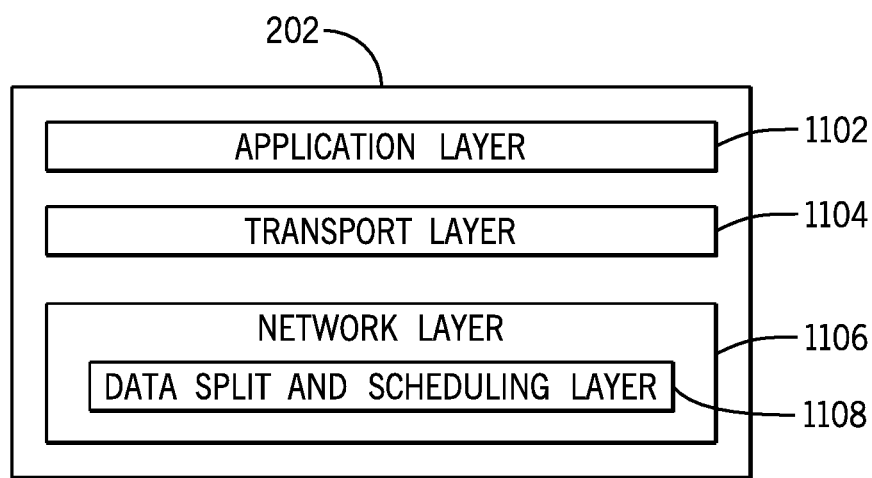
Figure 14:
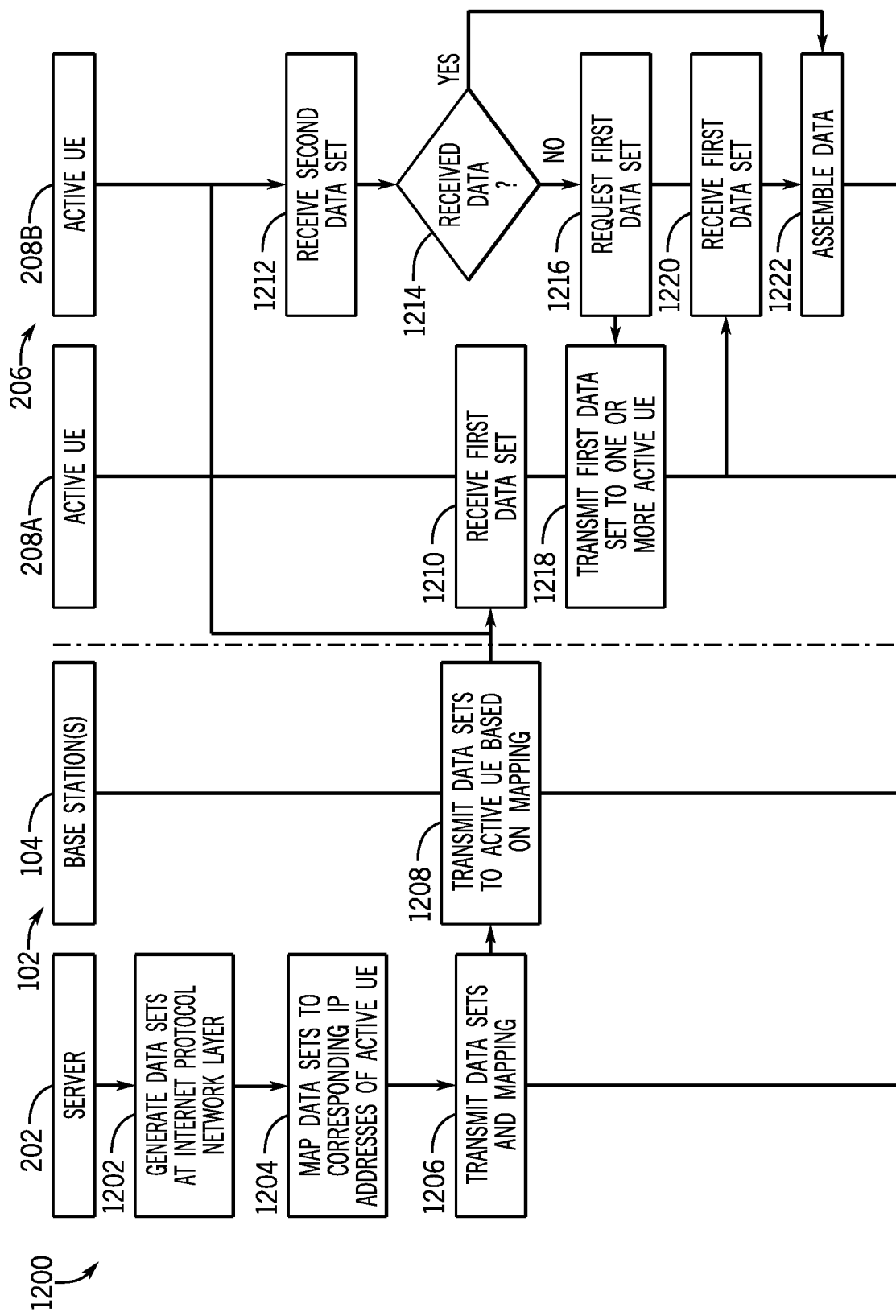
Figure 15:
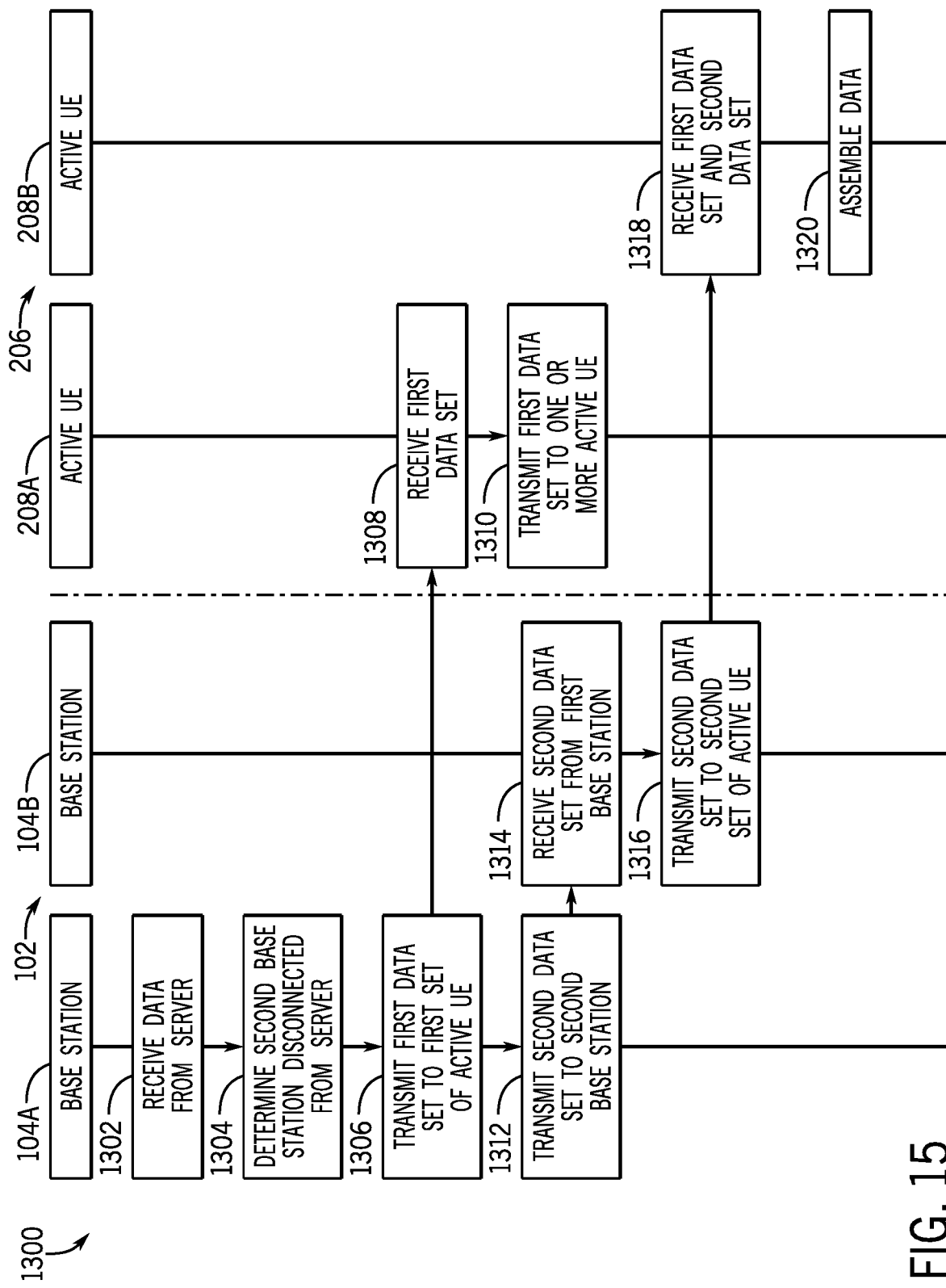
Figure 16:
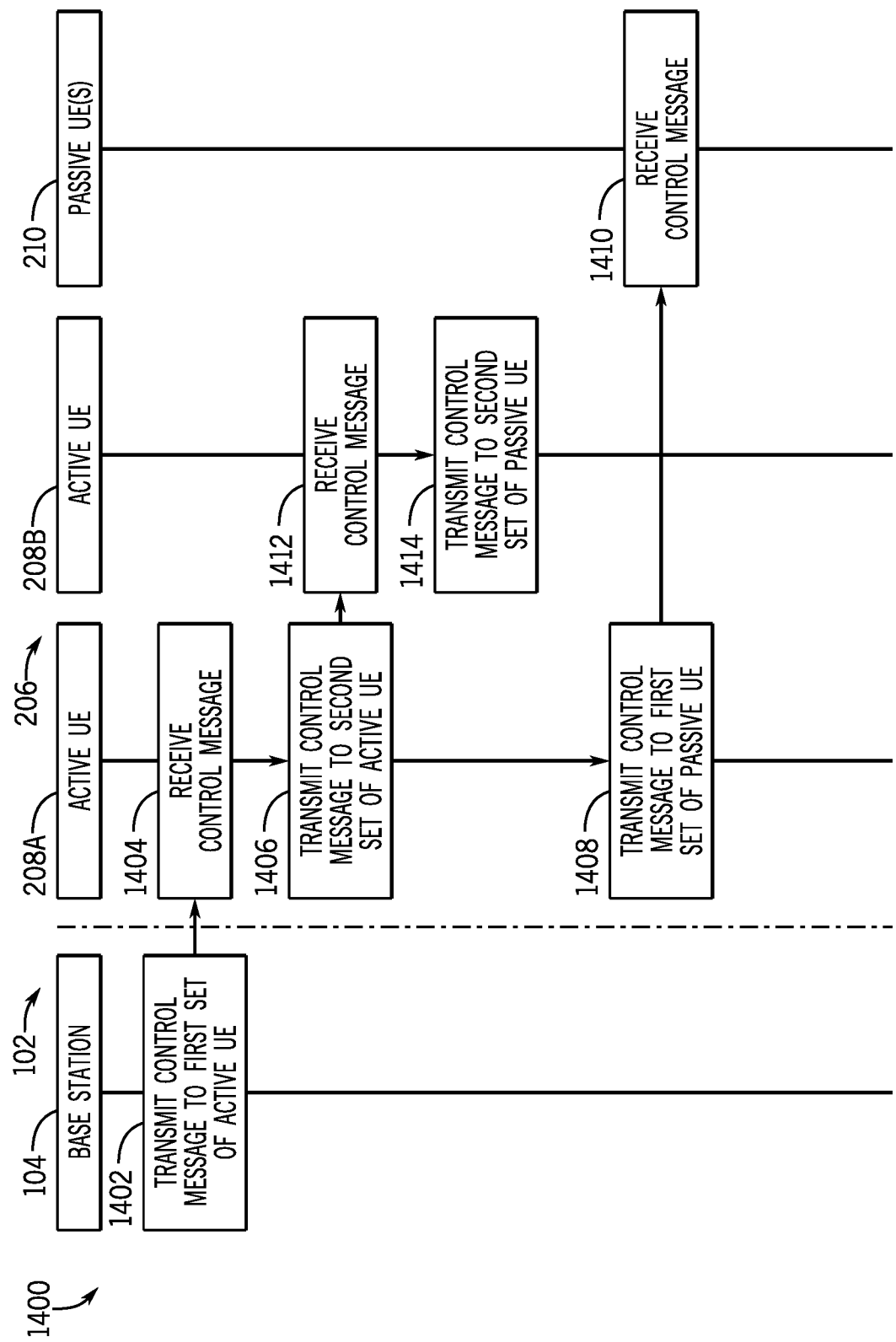
Figure 17:
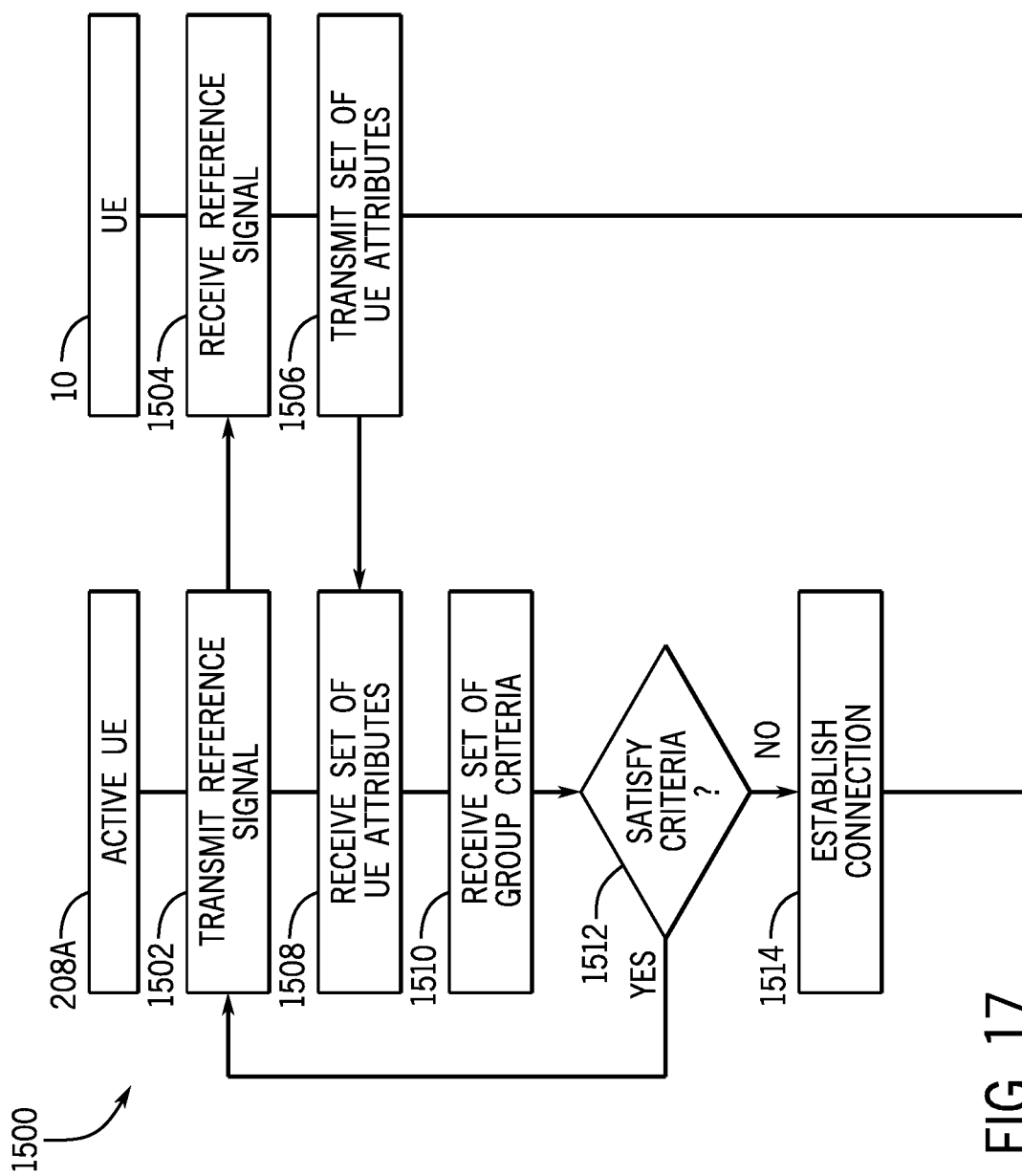
Figure 18:
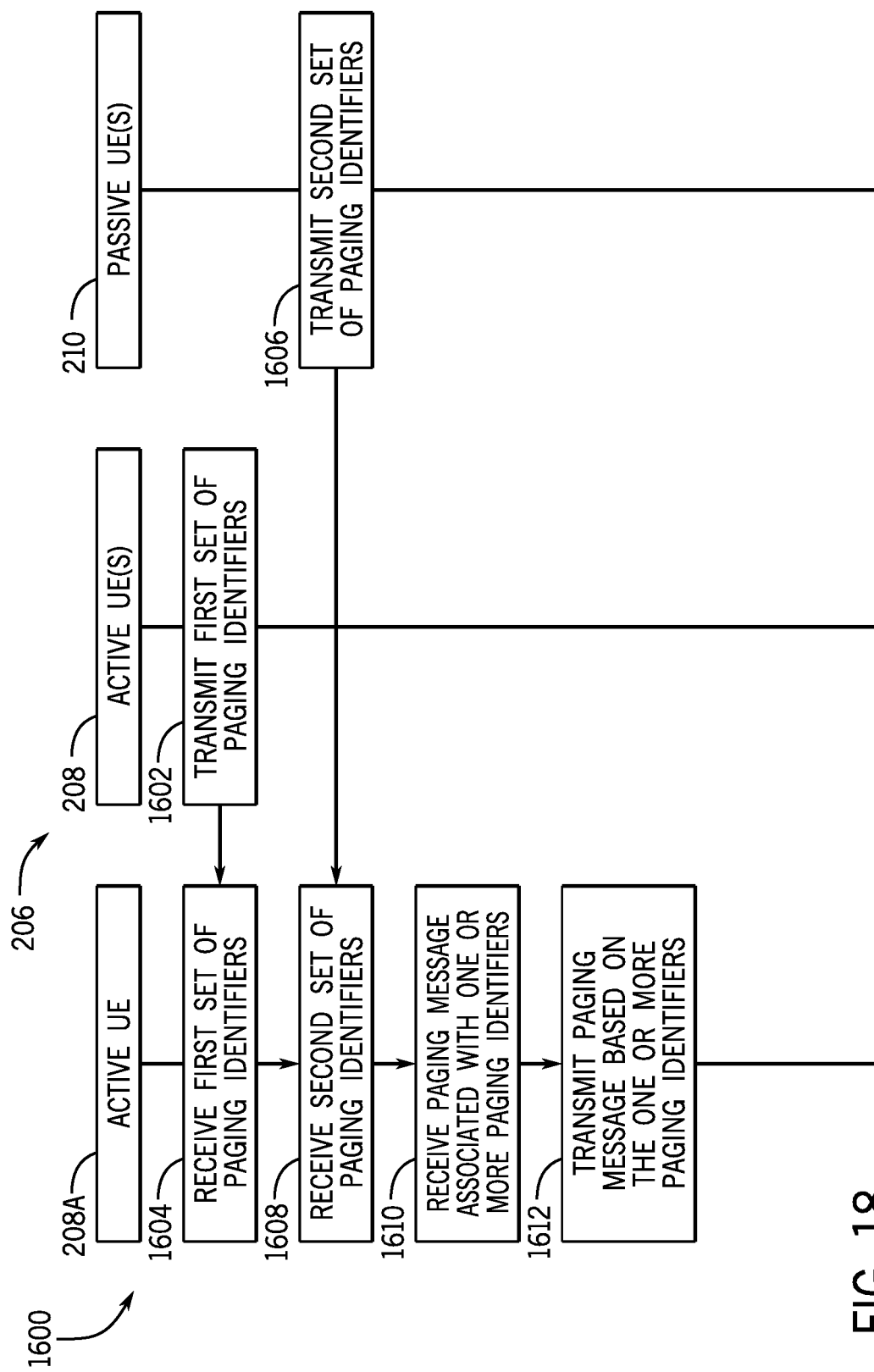
Figure 19:
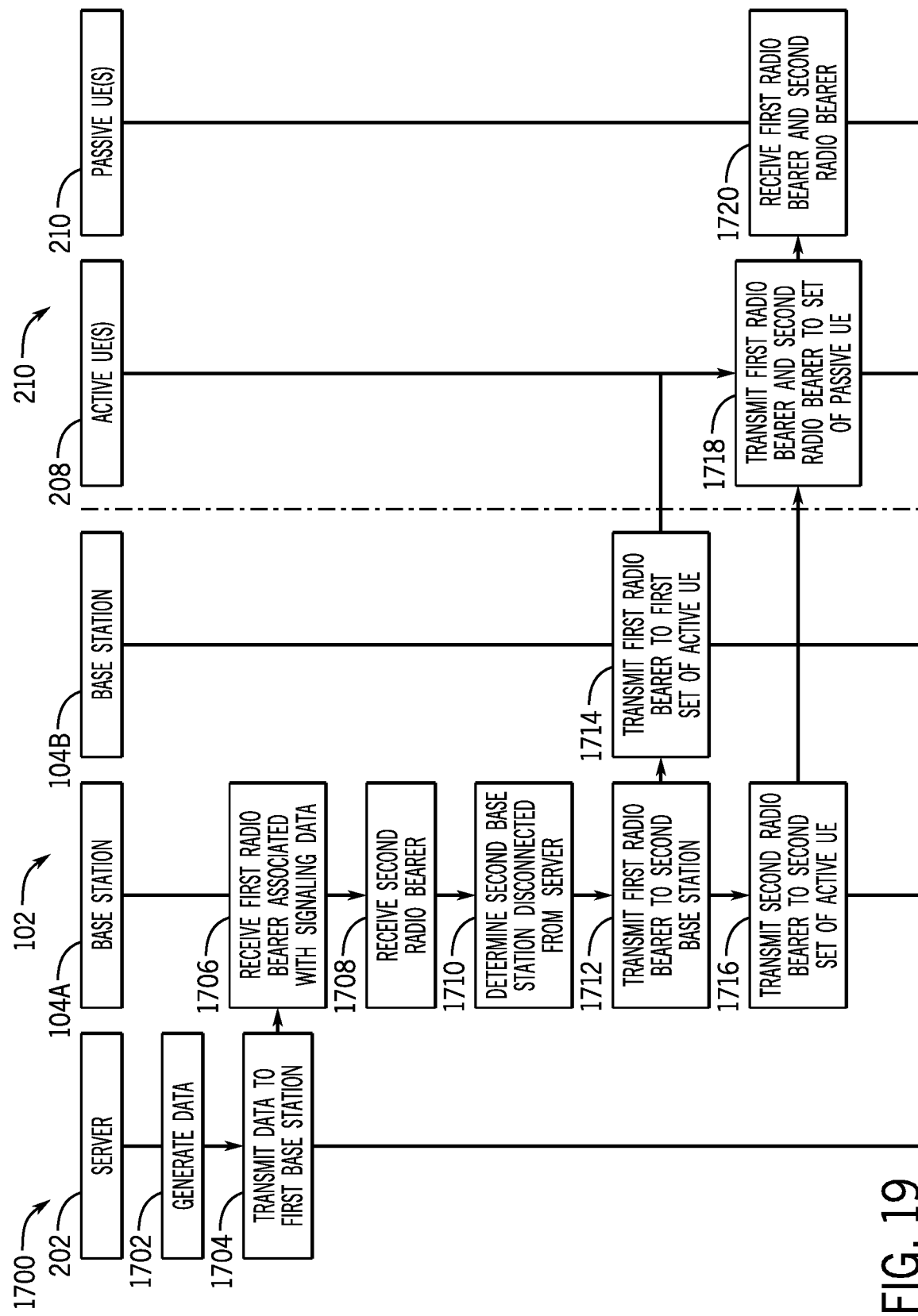

FIG. 9 is a flowchart of a method to download data to active user equipment of the group of user equipment of FIG. 4 using multiple base stations, according to embodiments of the present disclosure;

FIG. 10 is a flowchart of a method to download data to active user equipment and passive user equipment of the group of user equipment of FIG. 4 using multiple base stations, according to embodiments of the present disclosure;

FIG. 11 is a block diagram of Open Systems interconnection (OSI) model layers of the user equipment of FIG. 1, according to embodiments of the present disclosure;

FIG. 12 is a flowchart of a method to download data at an internet protocol layer of the user equipment of FIG. 1, according to embodiments of the present disclosure;

FIG. 13 is a block diagram of network protocol layers of a server of the wireless communication network of FIG. 3, according to embodiments of the present disclosure;

FIG. 14 is a flowchart of a method to download data using Internet Protocol (IP) addresses of active user equipment of the group of user equipment of FIG. 4, according to embodiments of the present disclosure;

FIG. 15 is a flowchart of a method to download data using a first base station communicatively coupled to a server and a second base station disconnected from the server of the wireless communication network of FIG. 3, according to embodiments of the present disclosure;

FIG. 16 is a flowchart of a method to download control messages to active user equipment and passive user equipment of the group of user equipment of FIG. 4, according to embodiments of the present disclosure;

FIG. 17 is a flowchart of a method to establish connection with the group of user equipment of FIG. 4, according to embodiments of the present disclosure;

FIG. 18 is a flowchart of a method to download paging messages for the group of user equipment of FIG. 4, according to embodiments of the present disclosure; and FIG. 19 is a flowchart of a method to download radio bearers to the group of user equipment of FIG. 4 using the wireless communication network of FIG. 3, according to embodiments of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members. Furthermore, as used herein, a set may include a portion (e.g., a subset, all) of data and/or information. While the data is described herein as including two data sets or three data sets, this is intended to be illustrative of certain embodiments. As such, the data may include any suitable number of data sets (e.g., two data sets, three data sets, four data sets, eight data sets, and so forth). Additionally, as used herein, a first set of user equipment may include the same user equipment as another set of user equipment, different user equipment than another set of user equipment, additional user equipment than another set of user equipment, fewer user equipment than another set of user equipment, and so forth.

The present disclosure relates generally to wireless communication, and more specifically to cooperative communication for user equipment in a group of user equipment. Wireless device density has increased rapidly over the years. Wireless communication between user equipment (UE) and wireless communication networks may occur directly through a point-to-point connection without regards to nearby user equipment. Wireless UE may also support several radio access technologies (RATs) simultaneously in close proximity to one another. Moreover, with the use of high spectrum frequencies (mmW, THz), the range of communication may be limited due to signal dissipation. Employing local communications (e.g., device-to-device communications, sidelink, peer-to-peer) may facilitate and improve the range, coverage, reliability and efficiency of communications between user equipment and wireless communication networks. This disclosure relates to systems, apparatuses, and techniques to enable user equipment to cooperate with adjacent user equipment to improve coverage and capacity.

User equipment may establish groups to facilitate and coordinate communication with wireless communication networks. Cooperative communication between user equipment may be beneficial for offloading data and controlling transmissions to one or more designated user equipment within a group of user equipment. Data sharing (e.g., via a device-to-device communication link) may also reduce power consumption for user equipment in the group when compared to directly (e.g., without an intervening or intermediate device) communicating with a network. Embodiments herein provide various systems, apparatuses, and techniques to provide cooperative communication for a group of user equipment. In particular, a communication network (e.g., a 5$^{th}$ generation (5G)/New Radio (NR) network, a 4$^{th}$ generation (4G)/long term evolution (LTE®) network, a 6$^{th}$ generation (6G) or greater than 6G network, and so on), via a base station, may communicate with the group of user equipment via one or more active user equipment (e.g., user equipment connected to or directly connected to the communication network). The active user equipment may communicate with passive user equipment (e.g., user equipment disconnected from the communication network). In particular, the user equipment in the group may communicate using a personal area network (PAN), a local area network (LAN) or wireless local area network (WLAN), and/or a wide area network (WAN).

User equipment in close proximity with one another may transfer data and control information. For example, the user equipment may exchange data or data sets between each other. Each user equipment can receive and transmit data using RATs. The user equipment may transmit and receive data from a wireless communication network via any number of base stations. A group of user equipment may include active user equipment and passive user equipment. An active user equipment connects with one or more base stations and transfers data on a wireless communication network via the base station. That is, the active user equipment may be directly connected with one or more base stations. Additionally, the active user equipment may communicate with other active user equipment and passive user equipment. Passive user equipment may not connect to any base station and/or the wireless communication network and may communicate with other passive user equipment and active user equipment (e.g., via a sidelink, peer-to-peer, or device-to-device channel). That is, the passive user equipment may communicate indirectly with the base station and/or the wireless communication network via an active user device.

One or more of the active user equipment may be designated as a primary user equipment. The primary user equipment may control the group membership, define configuration for a device-to-device communication link, and may add or release user equipment from the group. In particular, primary user equipment may control roles for other user equipment in a local network. For example, a first user equipment, such as a portable electronic device may control and communicate with secondary user equipment, such as a television, a tablet, a computer, and so forth. In some instances, one or more active user equipment and one or more passive user equipment may act as relay user equipment. A relay user equipment may act as an intermediary device and may transfer data from one user equipment to another user equipment in the group. Additionally, the relay user equipment may facilitate communication with the wireless communication network by transferring (e.g., tunneling) data from the base station to other user equipment in the group.

The base stations of the wireless communication network may facilitate communication and provide access for active user equipment to receive and transfer data to and from an application server and/or a communication network. In certain instances, the base stations may be operated and/or controlled by separate carriers or operators. Additionally, the base stations may operate using the same or different communication technologies, such as one or more RATs and/or local networks.

One or more active user equipment may receive data or a data set. The active user equipment may transmit the data or the sets of data to other active user equipment and passive user equipment in the group. That is, the active user equipment may receive the data and/or the data sets and may cooperate and coordinate to facilitate communication of the data from a base station to other user equipment. In certain instances, each active user equipment may connect to one or more base stations. Moreover, the active user equipment may receive the same and/or different data or data sets from different base stations. Additionally, the different base stations may communicate with the active user equipment using the same or different communication technologies. The passive user equipment may receive the data or the data sets from other passive user equipment and/or the active user equipment. As such, a set of the user equipment (e.g., any number of active user equipment, any number of passive user equipment, or any combination thereof) may receive the data sets either directly (e.g., from the base station) and/or indirectly (e.g., from one or more active user equipment, from one or more passive user equipment, or any combination thereof) from the wireless communication network. The user equipment in the group may assemble the data based on the data sets.

In certain instances, the application server may split data into one or more data sets and may transfer the one or more sets to one or more base stations. The active user equipment may receive the sets from the base stations. For example, a first active user equipment may receive a first set from the first access point and a second active user equipment may receive a second set from the second base station. The active user equipment may exchange the data sets between each other and each active user equipment may reassemble the sets to form the data. Additionally or alternatively, the base stations may split data into data sets and/or may split data sets into data subsets.

In some instances, a first set of the active user equipment may utilize a second set of the active user equipment to receive and transfer one or more data sets. In particular, the active user equipment may cooperate and coordinate to transmit the same data and/or the same data sets. Additionally or alternatively, the first set of the active user equipment may not transmit its received data set. The first set of the active user equipment may receive one or more data sets from the second set of the active user equipment. Accordingly, only the first set of the active user equipment may receive all data sets and may reassemble the data. Additionally, the active user equipment may transmit one or more data sets to one or more passive user equipment. Alternatively, the active user equipment may transmit the data to one or more passive user equipment. In some instances, a first passive user equipment may transmit one or more data sets or the data to a second passive user equipment. Additionally, the active user equipment may cooperate to transmit the same data set to one or more base stations simultaneously, concurrently, consecutively, overlapping, separately, and so forth. Moreover, a passive user equipment may transmit the same data set to several active user equipment for transmission to the base stations. In certain instances, the passive user equipment may transmit the same data set sequentially or broadcast concurrently to several active user equipment.

In order to transfer data and/or data sets consistently and efficiently, the base stations and/or the active user equipment may split the data into data sets and may transfer the data sets to user equipment within the group. The user equipment may then transfer the data and/or the data sets to other user equipment in the group using local networks and local connections. Once received, the user equipment may assemble the data sets. Data transfer, data splitting, and/or data assembly may be implemented in different layers of various communication protocols. In some instances, the data may be split in the Packet Data Convergence Protocol (PDCP) dataplane layer. The PDCP layer of the base station splits the data into any number of data sets and transfers the data sets to two or more active user equipment. In certain instances, the base station may transfer multiple data sets to an active user equipment and/or the same data sets to multiple active user equipment. The active user equipment may receive the data, shares the data, and assembles the data on the PDCP level. For upload, active user equipment may apply a PDCP duplication procedure and share a redundant copy of the data with one or more other active user equipment. Accordingly, the active user equipment may then transmit the same set of PDCP data to the base station. The base station may then receive the data and provide it to the application server. In another instance, the data may be split in the physical layer. In yet another instance, the data may be split in a new sub-layer of the Internet Protocol (IP) Network layer. The new sub-layer may be defined as a Data Split and Scheduling Layer. The new sub-layer may split the data stream into one or more data sets and map the data sets to IP addresses of one or more active user equipment.

Additionally, the data may be steered to particular or target active user equipment. For example, the application server may determine a first data set to transmit to a first active user equipment, a second data set to transmit to a second active user equipment, and so forth. Additionally or alternatively, a first base station may determine a third data set to transmit to a second base station based on a connection status between the second base station and the application server.

In certain embodiments, the application server and/or the base stations may generate and/or provide routing information associated with the data. The routing information may include a path (e.g., sequence of user equipment that receive the data, ordering of user equipment that receive the data, and so forth). For example, the base station may generate and/or receive the routing information based on information associated with the group of user equipment. The information may include a list of device-to-device communication links (e.g., current communication links, historical communication links, available communication links, and so forth) between the user equipment. The base station may generate and/or receive a path for transmission of the data to the target user equipment. The base station may first transmit the routing information to one or more active user equipment communicatively coupled to the base station. The routing information may specify one or more active user equipment to receive the data and/or the routing information from the base station. In certain embodiments, the routing information may specify one or more passive user equipment to receive the data and/or the routing information from the one or more active user equipment. Additionally or alternatively, the routing information may specify one or more active user equipment and/or one or more passive user equipment to transmit the data and/or the routing information to the target user equipment. As such, the routing information may specify a path or routing for the data and/or the routing information to take from the application server to the base stations to the user equipment (e.g., active user equipment, passive user equipment, target user equipment).

In some embodiments, the routing information may specify a first set of active user equipment to transmit the data and/or the routing information to from a first base station. Additionally or alternatively, the routing information may specify a second set of active user equipment to transmit the data and/or the routing information to from a second base station. As such, the routing information may include a path or routing for the data and/or the routing information from the application server to one or more active user equipment within the group of user equipment via the base stations. In certain embodiments, the routing information may specify a first set of passive user equipment to transmit the data and/or the routing information to from the first set of active user equipment. Additionally or alternatively, the routing information may specify a second set of passive user equipment to transmit the data and/or the routing information to from the second set of active user equipment. The routing information may also specify active user equipment transmit the data and/or the routing information to other active user equipment. The routing information may also specify passive user equipment transmit the data and/or the routing information to other passive user equipment. The routing information may also specify the target user equipment to receive the data and/or the routing information. While the above describes paths or routing for data from an application server to target user equipment, routing information may also be used to specify a path or routing for data from any user equipment to the application server via active user equipment, passive user equipment, base stations, and so forth. Additionally or alternatively, the routing information may be transmitted (e.g., by the base stations, by the user equipment) concurrently with the data, subsequently to transmission of the data, prior to transmission of the data, or any other suitable timing.

Active user equipment may be controlled using control channels based on the direct connection to the base station. Passive user equipment may have an indirect connection and may be accessible via an updated control channel path. Control channels provide configuration data to user equipment for paging the user equipment and scheduling data reception and transmission. Active user equipment may identify that a paging message, a configuration message, and/or control data is intended for passive user equipment. The active user equipment may perform the identification based on an identifier associated with a protocol layer format. For example, a MAC Control Element (MAC CE) may be utilized as an identifier. In some instances, the MAC CE may be applicable for all user equipment within a group of user equipment and may be received by a first active user equipment and transmitted to any number of other active user equipment and passive user equipment. In another instance, the MAC CE may be applicable to a single user equipment, including passive user equipment.

A Radio Resource Control (RRC) message may provide configuration data to user equipment. The base station may transmit the RRC message to an active user equipment that in turn transmits the message to a passive user equipment. Responses may be transmitted to the base station via the active user equipment (e.g., in some cases, from passive user equipment). Downlink Control Information (DCI) and Uplink Control Information (UCI) may be utilized to control the physical layer operation.

Moreover, the user equipment may utilize various criteria for entering and/or leaving a group of user equipment. The criteria may include a network signal quality of the user equipment, a power connection, a battery level of the user equipment, a time window, a geographic area of the user equipment, user equipment capabilities (e.g., communication capabilities, computing and/or processing capabilities, sensing capabilities, and so forth), a device-to-device connection, a trust level between user equipment, and so forth. The network signal quality of the user equipment may be compared to a threshold. When below the threshold, there may be a risk that service is interrupted. If another user equipment or a group of user equipment are in close proximity, the user equipment may attempt to form a group or enter the previously formed group. If a user equipment is connected to an electrical grid (e.g., such that it is not powered via its battery), it may no longer require the benefits of shared resources within a group and may leave the group. Alternatively, when connected to electrical grid, the user equipment may receive additional tasks within the group.

User equipment may be permitted to search for and join a group of user equipment during a particular time window. Additionally, the user equipment may search for and enter a group of user equipment when within a particular geographic area or in proximity or range of a set of user equipment, such as a home or an office. Alternatively, the user equipment may leave a group when leaving the particular geographic area or the proximity or range of the set of user equipment. User equipment that lacks radio technology or does not support particular frequencies may search for and enter a group of user equipment with different and/or greater user equipment capabilities. Additionally, the user equipment may determine whether the user equipment capabilities permit the user equipment to communicate with other user equipment in the group. The user equipment may determine whether a stable device-to-device connection is available with one or more user equipment in the group based on the Received Signal Strength Indicator (RSSI) and signal to noise ratio (SNR), or other signal characteristics. User equipment trust may be established based on previously entering the group of user equipment.

Entering a group of user equipment may begin with group discovery. One or more user equipment within the group may transmit reference signals on a local communications frequency. The reference signals may include specialized wake-up signals that reduce power consumption. User equipment outside the group may periodically search for and attempt to detect the reference signals. The user equipment may measure the reference signals and join the group. The next step of entering the group includes establishing device-to-device connections. The device-to-device connection may be direct or through a local network connection. The user equipment may also exchange user equipment capabilities. The user equipment capabilities may be utilized to determine preferred communication frequencies, the types of communication technologies of the group and the new user equipment, a current battery status of the user equipment, a current thermal status of the user equipment, and so forth. Each user equipment may periodically send a keep alive message to at least one primary user equipment in the group.

To maintain the group, the number of active user equipment and/or the number of passive user equipment may be controlled (e.g., by the primary user equipment). For example, if an active user equipment leaves coverage of a base station, the active user equipment may be reassigned as a passive user equipment. A primary user equipment may fall below a battery threshold and a new primary user equipment may be assigned. The primary user equipment may receive regular updates from other user equipment in the group regarding battery status, thermal status, and link status of the user equipment. Additionally, the primary user equipment may maintain a list of candidates from the active user equipment to be assigned as a new primary user equipment. The primary user equipment may send a request to one of the candidates to become a new primary user equipment.

FIG. 1 is a block diagram of user equipment 10 (e.g., a mobile electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FTC)), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

Figure 2:
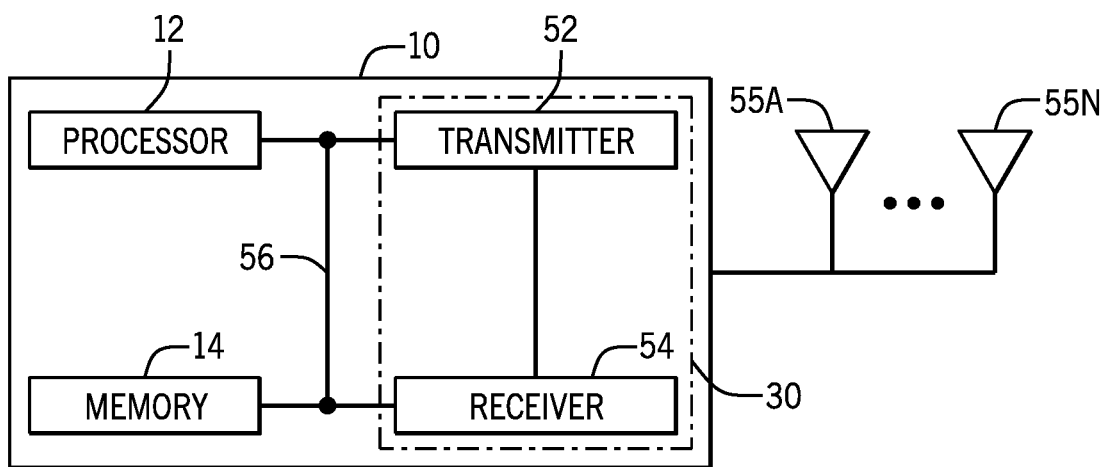
FIG. 2 is a functional diagram of the user equipment of FIG. 1, according to embodiments of the present disclosure.

FIG. 2 is a functional diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and/or reception of data between the user equipment 10 and an external device via, for example, a network (e.g., including base stations or access points) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

Moreover, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

FIG. 3 is a schematic diagram of a communication system 100 including the user equipment 10 of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the base stations 104 may include at least some of the components of the user equipment 10 shown in FIGS. 1 and 2, including one or more processors 12, the memory 14, the storage 16, the transceiver 30, the transmitter 52, and the receiver 54. It should be understood that while the present disclosure may use 5G/NR as an example specification or standard, the embodiments disclosed herein may apply to other suitable specifications or standards (e.g., such as the 4G/LTE specification). Moreover, the network 102 may include any suitable number of base stations 104 (e.g., one or more base stations 104, four or more base stations 104, ten or more base stations 104, and so on). Additionally or alternatively, the base stations 104 may include any number of user equipment 10 that communicatively couple to the wireless communication network.

FIG. 4 is a schematic diagram of a communication system 200 including the base stations 104 (e.g., base stations 104A, 104B, 104C), an application server 202, and a group of user equipment 206. The application server 202 may include any suitable electronic device (e.g., a desktop personal computer, a laptop, a mobile electronic device, a tablet, a smartphone, a wearable device, or any other suitable computing device) and may include at least some of the components of the user equipment 10 shown in FIGS. 1 and 2, including one or more processors 12, the memory 14, the storage 16, the transceiver 30, the transmitter 52, and the receiver 54. The communication system 200 may include any suitable number of application servers 202 (e.g., one or more application servers 202, four or more application servers 202, and so on). The base stations 104 may provide access for the group of user equipment 206 to transfer data and/or control information to and from the application server 202. In certain embodiments, a first base station 104A may be associated with a different carrier or operator from a second base station 104B. Additionally or alternatively, one or more of the base stations 104 may operate using the same carrier. The group of user equipment 206 may cooperate for transferring data and/or control information. The group of user equipment 206 may include any number of active user equipment 208A, 208B, 208C (referred to collectively as active user equipment 208) and/or any number of passive user equipment 210A, 210B (referred to collectively as passive user equipment 210). Each user equipment (e.g., active user equipment 208, passive user equipment 210) may include any suitable electronic device and may be an example of the user equipment 10 shown in FIGS. 1 and 2. As such, each of the user equipment may include at least some of the components of the user equipment 10, such as one or more processors 12, the memory 14, the storage 16, the transceiver 30, the transmitter 52, and the receiver 54. Additionally, the group of user equipment 206 may include any suitable number of user equipment (e.g., any suitable number of active user equipment 208, any suitable number of passive user equipment 210).

Each of the active user equipment 208 may be communicatively coupled to the wireless communication network 102 (e.g., via at least one of the base stations 104). Additionally or alternatively, the active user equipment 208 may be communicatively coupled to other active user equipment 208 and/or at least one passive user equipment 210. For example, the active user equipment 208 may be communicatively coupled via any suitable communication technique, such as a device-to-device communication link, sidelink communication, peer-to-peer communication, and so forth. In certain embodiments, the active user equipment 208A may serve as a relay for at least one active user equipment 208 and/or at least one passive user equipment 210. For example, the active user equipment 208A may transfer data and/or control information received from one user equipment (e.g., active user equipment 208B, passive user equipment 210A) in the group 206 to another user equipment (e.g., active user equipment 208C, passive user equipment 210B) in the group 206.

In certain embodiments, any suitable number of active UE 208 may be communicatively coupled with any number of base stations 104. A target UE (e.g., first active UE 208A, first passive UE 210B) may request data from the wireless communication network 102. The group of UE 206 may coordinate and cooperate to transmit the request to the wireless communication network 102. Each active UE 208 may receive the data 204 and/or one or more sets 204A, 204B (e.g., a portion, a subset) of the data from the wireless communication network 102 via base stations 104. The active UEs 208 may transfer the sets of data to other active UEs 208 within the group of user equipment 206. The active UEs 208 may assemble the data based at least in part on the received sets of the data. The group of user equipment 206 may coordinate and cooperate to provide the data to the target UE. Accordingly, the target UE may receive the data and/or the data sets and may assemble the data based on the data sets.

Figure 5:
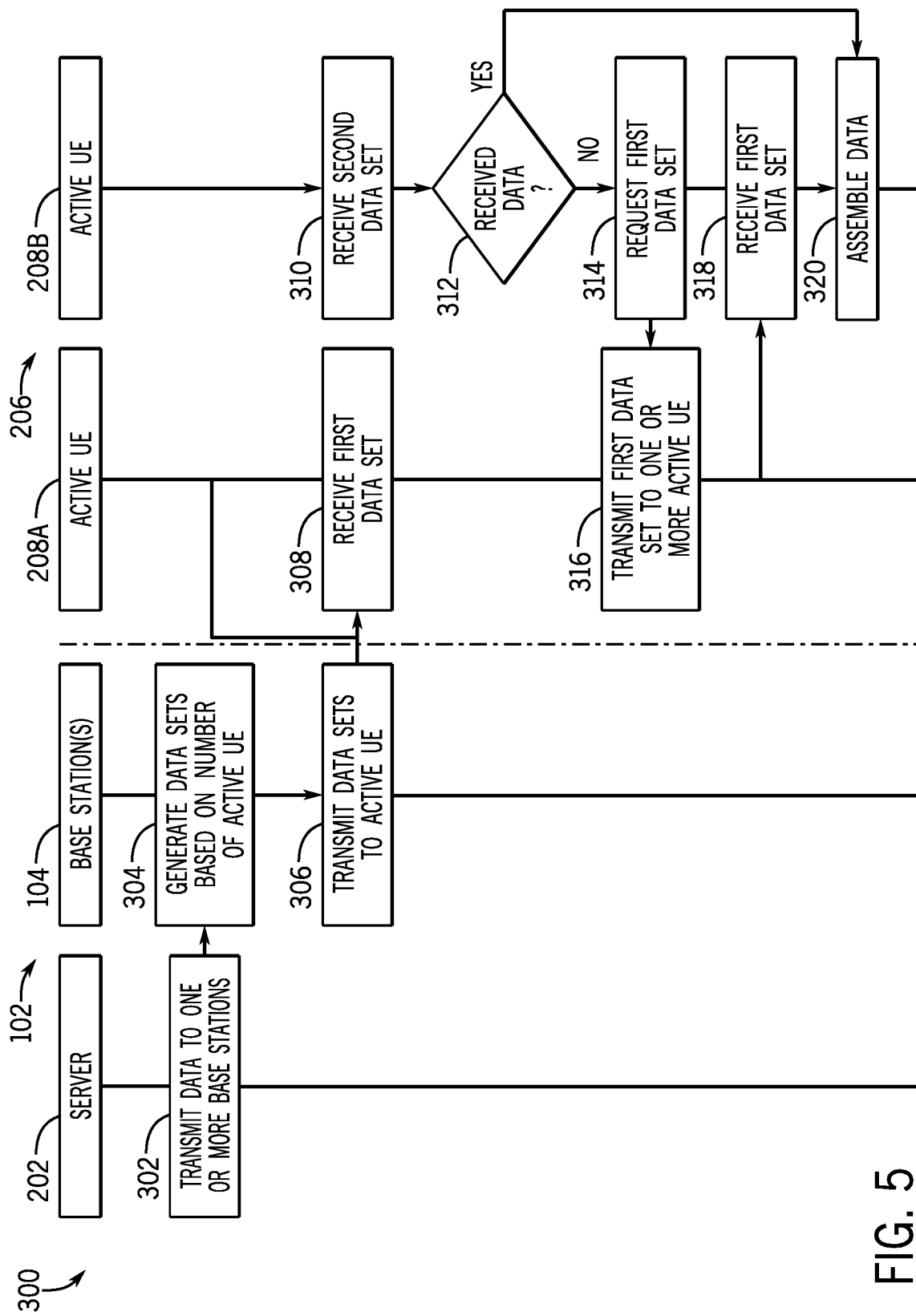
FIG. 5 is a flowchart of a method to download data to active user equipment of the group of user equipment of FIG. 4 using the wireless communication network, according to embodiments of the present disclosure.

With the foregoing in mind, FIG. 5 is a flowchart of a method 300 to download data to active user equipment 208 of the group of user equipment 206 of FIG. 4 using the wireless communication network 102, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 300. In some embodiments, the method 300 may be implemented by executing instructions stored in a tangible, non-transitory, computer-readable medium, such as the one or more respective memories 14 or storages 16 of these devices, using the processors 12. For example, the method 300 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the network 102 and/or the application server 202 broadcasts or transmits data to the base stations 104. The data may be transmitted to the network 102 via a source user equipment and intended (e.g., addressed) for a destination user equipment (which may include an active UE 208 or a passive UE 210). The base stations 104 may receive the data and may generate (block 304) any number of data sets. For example, the base station 104 may receive information associated with a number of active UEs 208 in the group of user equipment 206, a number of passive UEs 210 in the group of user equipment 206, and/or a number of UEs 10 (e.g., sum of number of active UEs and passive UEs) in the group of user equipment 206. The base station 104 may generate a number of data sets based at least in part on the number of active UEs 208, the number of passive UEs 210, and/or the number of UEs 10 in the group of user equipment 206. For example, the base station 104 may receive (e.g., generate) a number of data sets equal to a number of active UEs 208. As such, each active UE 208 may receive at least one data set from the wireless communication network 102. Alternatively, the base station may receive a number of data sets less than or greater than the number of active UEs 208. The base station 104 may transmit (block 306) the data sets to a set of active UEs 208 (e.g., all active UEs 208, active UEs 208 communicatively coupled to a particular base station 104, and so forth). The first active UE 208A may receive (block 308) a first data set of the data and a second active UE 208B may receive (block 310) a second data set of the data.

After receiving the second data set, the second active UE 208B may determine (block 312) whether the data has been received. For example, the second data set may include an indicator of a number of data sets that in the data. As such, the second active UE 208B may compare the indicator with a number of received data sets. If the data has not been received (NO path of block 312), the second active UE 208B may transmit (block 314) a request for data sets to any number of active UEs 208 in the group of user equipment 206. For example, the second active UE 208B may transmit a request to the first active UE 208A. The first active UE 208A may receive the request and may transmit (block 316) the first data set to one or more active UEs 208, such as the second active UE 208B, based on the request.

Additionally or alternatively, the first active UE 208A may transmit the first data set based on receiving the first data set. For example, the first active UE 208A may transmit the first data set via a device-to-device communication link to any UE 10 within the group of UEs 206 communicatively coupled to the first active UE 208A. Moreover, the second active UE 208B may transmit the second data set to one or more active UEs 208, such as the first active UE 208A, based on a request and/or based on receiving the second data set. For example, the second active UE 208B may determine a number of active UEs 208 communicatively coupled to the second active UE 208B and may transmit the second data set to at least a portion of those active UEs 208.

In certain embodiments, the second active UE 208B may transmit an instruction to cause the first active UE 208A to transmit and/or broadcast the first data set to a set of UEs of the group of UEs 206. For example, the set of UEs may include the second active UE 208B, any number of other active UEs 208, any number of passive UEs 210, or any combination thereof. Additionally or alternatively, the first active UE 208A may transmit an instruction to cause the second active UE 208B to transmit and/or broadcast the second data set to a second set of UEs of the group of UEs 206. For example, the second set of UEs may include the first active UE 208A, any number of other active UEs 208, any number of passive UEs 210, or any combination thereof. The second active UE 208B may receive (block 318) the first data set from the first active UE 208A via a device-to-device communication link. The second active UE 208B may assemble (block 320) the data based at least in part on the first data set and the second data set. In some embodiments, the active UE 208 may transmit and/or broadcast the data and/or the data sets to additional UEs within the group of UEs 206. For example, the active UE 208 may transmit the data and/or the data sets to other active UEs 208, passive UEs 210, or any combination thereof via the device-to-device connection.

In certain embodiments, the target UE may include a passive UE 210 and may request data from the wireless communication network 102. Each passive UE 210 may be disconnected from the wireless communication network 102 and/or each of the base stations 104. Each active UE 208 may be directly communicatively coupled to the wireless communication network 102 and/or one or more of the base stations 104 without any intermediate or intervening UE between the active UE 208 and the base stations 104. Alternatively, each passive UE 210 may be indirectly communicatively coupled to the wireless communication network 102 and/or one or more of the base stations 104 through at least one intermediary or intervening user equipment (e.g., at least one active UE 208, at least one active UE 208 and at least one passive UE 210). Additionally or alternatively, each passive UE 210 may not include a communication link to any of the base stations 104 or establish a communication session with the wireless communication network 102 and/or the base stations 104. As such, the passive UE 210 may transmit and receive data from the wireless communication network 102 and/or the base stations 104 via one or more intervening or intermediary UE. Each active UE 208 may receive the data and/or one or more sets (e.g., a portion, a subset) of the data from the wireless communication network 102 via base stations 104. The active UEs 208 may transmit the sets of data to other active UEs 208 and/or passive UEs 210 within the group of user equipment 206. The active UEs 208 and/or passive UEs 210 may assemble the data based at least in part on the received sets of the data. The group of user equipment 206 may coordinate and cooperate to provide the data to the target passive UE. Accordingly, the target passive UE may receive the data and/or the data sets and may assemble the data based on the data sets.

Figure 6:
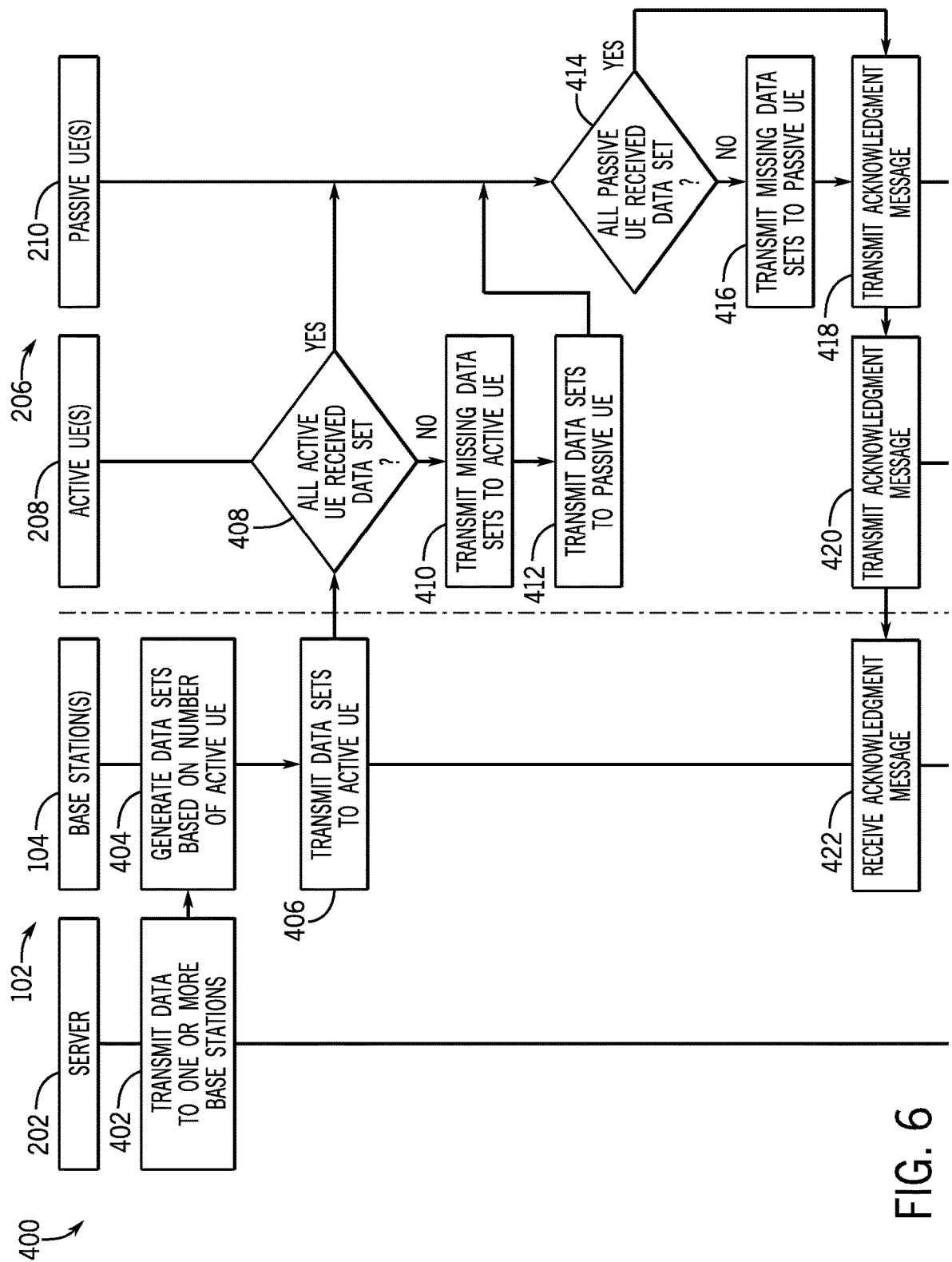
FIG. 6 is a flowchart of a method to download data to active user equipment and passive user equipment of the group of user equipment of FIG. 4 using the wireless communication network, according to embodiments of the present disclosure.

With the foregoing in mind, FIG. 6 is a flowchart of a method 400 to download data to active user equipment 208 and passive user equipment 210 of the group of user equipment 206 of FIG. 4 using the wireless communication network 102, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 400. In some embodiments, the method 400 may be implemented by executing instructions stored in a tangible, non-transitory, computer-readable medium, such as the one or more respective memories 14 or storages 16 of these devices, using the processors 12. For example, the method 400 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 400 is described using steps in a specific sequence, it should be understood that the present disclosure contemplates that the described steps may be performed in different sequences than the sequence illustrated, and certain described steps may be skipped or not performed altogether.

In process block 402, the network 102 and/or the application server 202 broadcasts or transmits data to the base stations 104. The base stations 104 may receive the data and may generate (block 404) any number of data sets. For example, the base station 104 may receive information associated with a number of active UEs 208 in the group of user equipment 206, a number of passive UEs 210 in the group of user equipment 206, and/or a number of UEs 10 (e.g., sum of number of active UEs and passive UEs) in the group of user equipment 206. The base station 104 may generate a number of data sets based at least in part on the number of active UEs 208, the number of passive UEs 210, and/or the number of UEs 10. For example, the base station 104 may receive (e.g., generate) a number of sets of the data equal to a number of active UEs 208. The base station 104 may transmit (block 406) the data sets to a set of active UEs 208 (e.g., all active UEs 208, active UEs 208 communicatively coupled to a particular base station 104, and so forth).

The active UEs 208 may determine (block 408) whether each active UE 208 of the set of active UEs 208 have received the data sets. For example, one or more active UEs 208 may request the data and/or the data sets from another active UEs 208. In response to a request for missing data (NO path of block 408), one or more active UEs 208 may transmit (block 410) the data and/or the data sets to one or more other active UEs 208 within the group of UEs 206. The active UEs 208 may also transmit (block 412) the data and/or the data sets to a set of passive UEs 210. Based on each active UE 208 receiving the data sets (YES path of block 408), the active UEs 208 may transmit (block 412) the data and/or the data sets to the set of passive UEs 210. At block 414, the passive UEs 210 may determine whether the set of passive UEs 210 have received the data and/or the data sets. Additionally or alternatively, the passive UEs 210 may determine whether the target UE has received the data and/or the data sets. In certain embodiments, one or more passive UEs 210 may request the data and/or the data sets from another passive UEs 210. In response to a request for missing data (NO path of block 414), the passive UEs 210 may transmit (block 416) the data and/or the data sets to one or more other passive UEs 210. If the set of passive UEs 210 received the data and/or the data sets (YES path of block 414), the passive UEs 210 may also receive an acknowledgement message from the set of passive UEs 210 indicating the set of passive UEs 210 received the data and/or the data sets. The passive UEs 210 may transmit (block 418) the acknowledgement message to the active UEs 208. The active UEs 208 may receive the acknowledgment message and may transmit (block 420) the acknowledgement message to the wireless communication network 102 via the base stations 104. As such, the base stations 104 may receive (block 422) the acknowledgment message. Accordingly, the wireless communication network 102 may transmit data to the group of UEs 206 and a passive UE 210 may receive and assemble the data based on one or more data sets.

In certain embodiments, a target UE (e.g., first active UE 208A, first passive UE 210B) may transmit (e.g., directly, indirectly via intervening or intermediary UE) data to the wireless communication network 102. Active UEs 208 may receive the data and/or one or more sets (e.g., a portion, a subset) of the data from other UEs (e.g., active UEs 208, passive UEs 210) in the group of user equipment 206. The active UEs 208 may transmit the sets of data to other active UEs 208 within the group of user equipment 206. The active UEs 208 may assemble the data based at least in part on the received sets of the data and may transmit the data and/or the data sets to the base stations 104. As such, the group of user equipment 206 may coordinate and cooperate to provide the data to the wireless communication network and/or the base stations 104.

Figure 7:
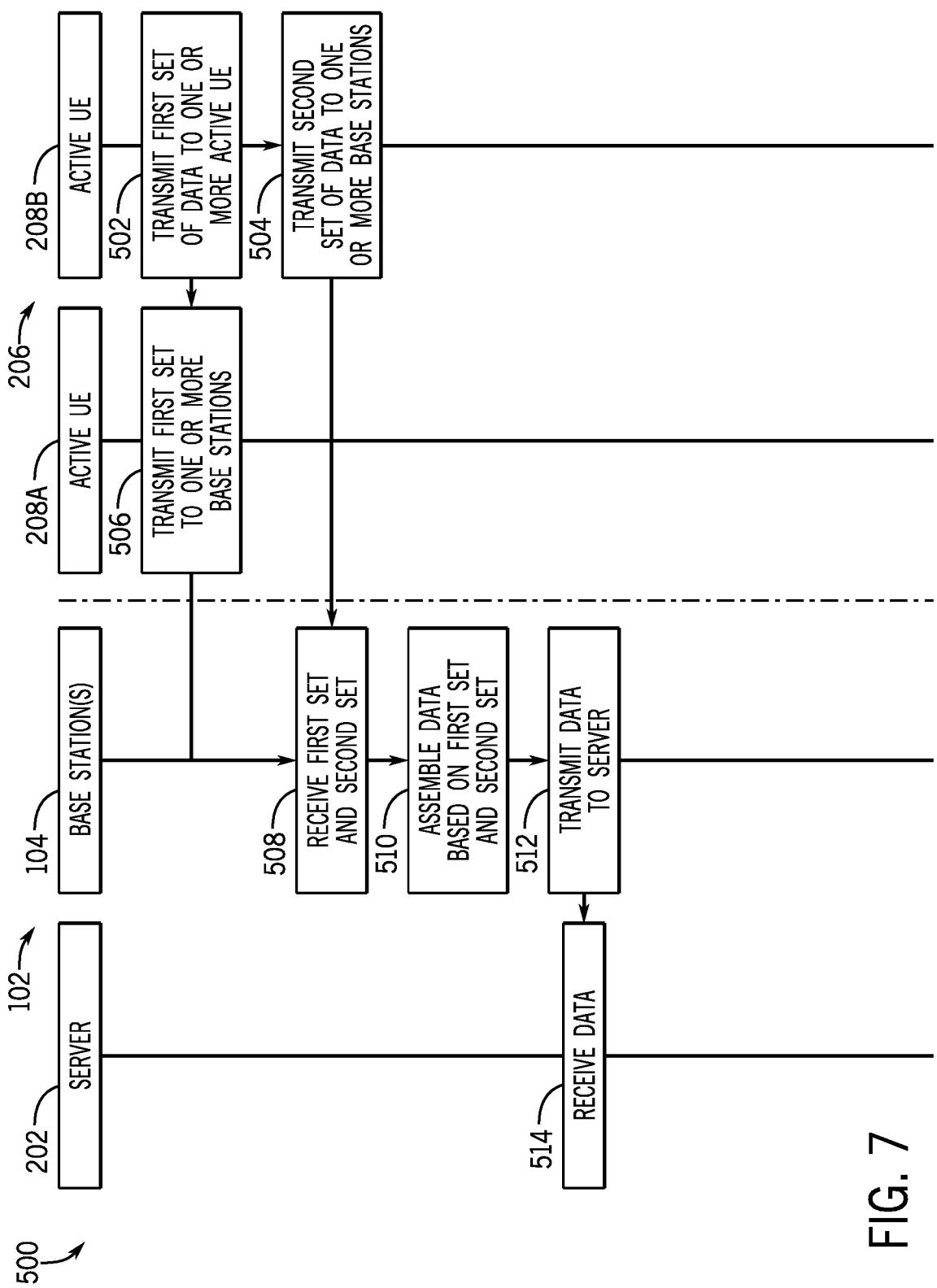
FIG. 7 is a flowchart of a method to upload data to base stations of the wireless communication network of FIG. 3 using active user equipment of the group of user equipment, according to embodiments of the present disclosure.

With the foregoing in mind, FIG. 7 is a flowchart of a method 500 to upload data to base stations 104 of the wireless communication network 102 of FIG. 3 using active user equipment 208 of the group of user equipment 206, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 500. In some embodiments, the method 500 may be implemented by executing instructions stored in a tangible, non-transitory, computer-readable medium, such as the one or more respective memories 14 or storages 16 of these devices, using the processors 12. For example, the method 500 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 500 is described using steps in a specific sequence, it should be understood that the present disclosure contemplates that the described steps may be performed in different sequences than the sequence illustrated, and certain described steps may be skipped or not performed altogether.

One or more active UEs 208 may receive data and may generate any number of data sets based on the data. For example, the second active UE 208B may receive data from passive UEs 210. Additionally or alternatively, the second active UE 208B may receive the data sets from the passive UEs 210 and/or another active UEs 208. In other instances, the second active UE 208B may generate the data and/or the data sets. At block 502, the second active UE 208B may transmit a first data set to a first active UE 208A. The second active UE 208B may also transmit (block 504) a second data set to the wireless communication network 102 via the base stations 104. The first active UE 208A may receive the first data set and may transmit (block 506) the first data set to the wireless communication network 102 via the base stations 104. As such, the wireless communication network 102 may receive the data via wireless communication with multiple active UEs 208 within the group of UEs 206. Additionally, the active UEs 208 may transmit the data to multiple base stations 104. For example, the first active UE 208A may transmit the first data set to the first base station 104A and the second active UE 208B may transmit the second data set to the second base station 104B.

At block 508, the base station 104 may receive the first data set and the second data set. The base station 104 may assemble (block 510) the data based at least in part on the first data set and the second data set and may transmit (block 512) the data and/or the data sets to the application server 202. The application server 202 may receive (block 514) the data and/or the data sets. As such, the group of UEs 206 may transmit data to the wireless communication network through coordination and cooperation between one or more active UEs 208. In certain embodiments, one or more active UEs 208 may transmit (e.g., simultaneously, concurrently, consecutively, overlapping, separately, and so forth) the data and/or the data sets. As such, the group of UEs 206 may provide redundant transmission of data to provide better coverage and reliability.

In certain embodiments, the target UE may be a passive UE 210 and may indirectly transmit data to the wireless communication network 102. As such, the passive UEs 210 may transmit data to one or more intervening or intermediary UEs. Active UEs 208 and/or other passive UEs 210 may receive the data and/or one or more sets (e.g., a portion, a subset) of the data from the target UE. The active UEs 208 may transmit the sets of data to other active UEs 208 and/or passive UEs 210 within the group of user equipment 206. The active UEs 208 and/or passive UEs 210 may assemble the data based at least in part on the received sets of the data. The active UEs 208 may transmit (e.g., simultaneously, concurrently, consecutively, overlapping, separately, and so forth) the data and/or the data sets to the wireless communication network 102 and/or the base stations 104. As such, the group of user equipment 206 may coordinate and cooperate to provide the data from a passive UE 210 to the wireless communication network 102 and/or the base stations 104.

Figure 8:
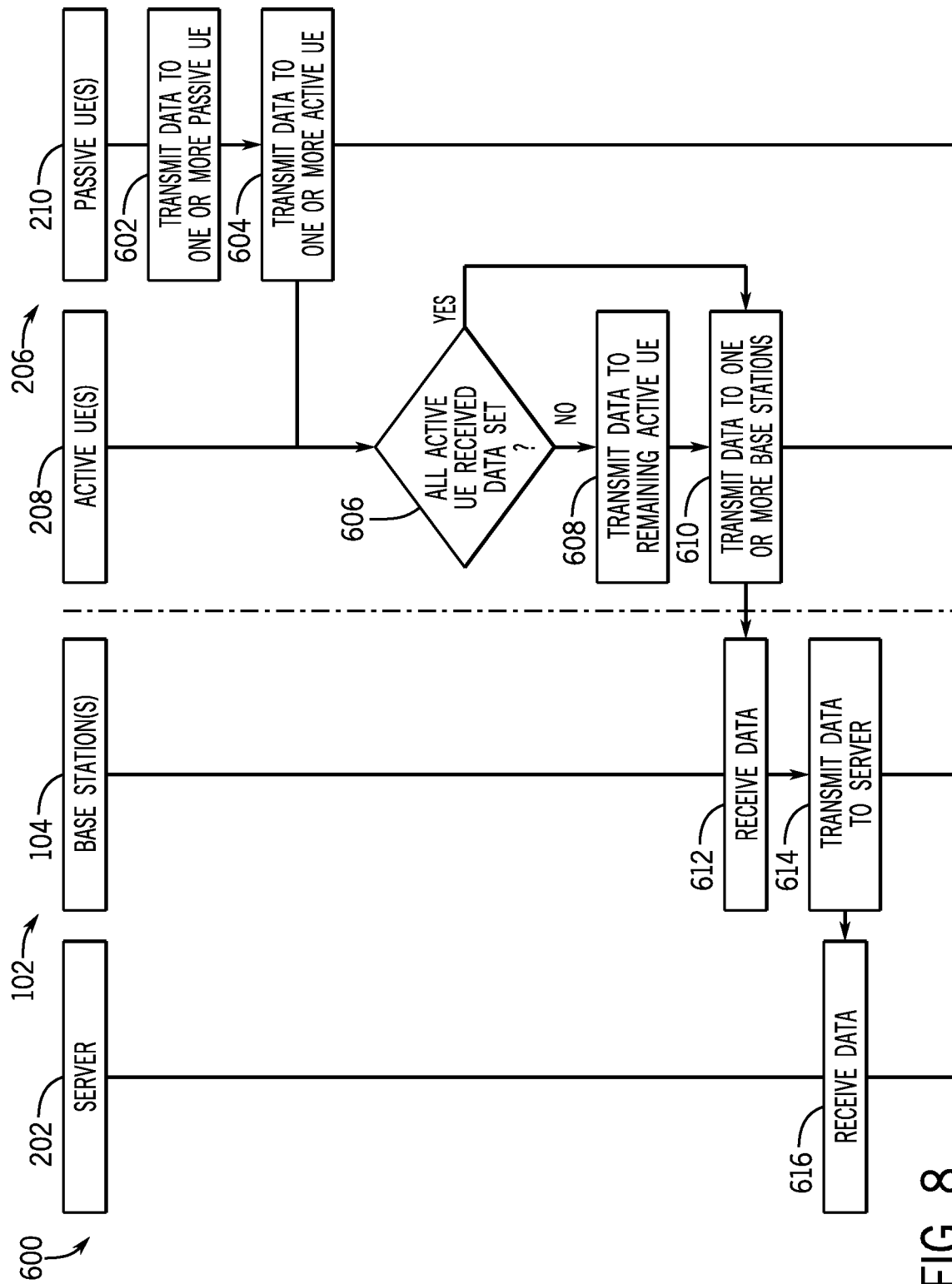
FIG. 8 is a flowchart of a method to upload data to base stations of the wireless communication network of FIG. 3 using active user equipment and passive user equipment of the group of user equipment, according to embodiments of the present disclosure.

With the foregoing in mind, FIG. 8 is a flowchart of a method 600 to upload data to base stations 104 of the wireless communication network 102 of FIG. 3 using active user equipment 208 and passive user equipment 210 of the group of user equipment 206, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 600. In some embodiments, the method 600 may be implemented by executing instructions stored in a tangible, non-transitory, computer-readable medium, such as the one or more respective memories 14 or storages 16 of these devices, using the processors 12. For example, the method 600 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 600 is described using steps in a specific sequence, it should be understood that the present disclosure contemplates that the described steps may be performed in different sequences than the sequence illustrated, and certain described steps may be skipped or not performed altogether.

One or more passive UEs 210 may receive data and may receive (e.g., generate) any number of data sets based on the data. For example, the second passive UE 210A may receive data and/or the data sets from the first passive UE 210A. Additionally or alternatively, the second passive UE 210B may receive the data and/or the data sets from active UEs 208. In other instances, the second passive UE 210B may generate the data and/or the data sets. At block 602, the passive UEs 210 may transmit data to another set of passive UEs 210. The passive UEs 210 may also transmit (block 604) the data to a set of active UEs 208. The active UEs 208 may determine (block 606) whether the set of active UEs 208 received the data. If one or more active UEs 208 did not receive the data (NO path of block 606), the active UEs 208 may transmit (block 608) the data to other active UEs 208 within the group of UEs 206. If the active UEs 208 did receive the data (YES path of block 606), each active UE 208 that received the data may transmit (block 610) the data to the base stations 104.

At block 612, the base station 104 may receive the data and may transmit (block 614) the data to the application server 202. The application server 202 may receive (block 616) the data. As such, the group of UEs 206 may transmit data to the wireless communication network 102 through coordination and cooperation between one or more active UEs 208 and/or one or more passive UEs 210. In certain embodiments, one or more active UEs 208 may transmit (e.g., simultaneously, concurrently, consecutively, overlapping, separately, and so forth) the data and/or data sets to the wireless communication network 102 and/or to other active UEs 208. As such, the group of UEs 206 may provide redundant transmission of data to provide better coverage and reliability. Additionally or alternatively, one or more passive UEs 210 may transmit (e.g., simultaneously, concurrently, consecutively, overlapping, separately, and so forth) the data and/or data sets to other passive UEs 210 and/or active UEs 208.

In some embodiments, the application server 202 may split data into one or more data sets and may transfer the one or more data sets to one or more base stations 104. For example, the application server 202 may split the data into a number of data sets equal to or greater than the number of base stations 104 of the wireless communication network 102. Additionally or alternatively, the application server 202 may split the data into a number of data sets equal to or greater than a number of active UEs 208 in the group of UE 210. The base stations 104 may transmit the data and/or the data sets to the active UEs 208. The active UEs 208 may receive the data sets from the base stations 104. For example, the first active UE 208A may receive a first data set from the first base station 104A and a second active UE 208B may receive a second data set from the second base station 104B. The active UE 208 may exchange the data sets between each other and each active UE 208 may reassemble the data set to form the data.

With the foregoing in mind, FIG. 9 is a flowchart of a method 700 to download data to active user equipment 208 of the group of user equipment 206 of FIG. 4 using multiple base stations 104, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 700. In some embodiments, the method 700 may be implemented by executing instructions stored in a tangible, non-transitory, computer-readable medium, such as the one or more respective memories 14 or storages 16 of these devices, using the processors 12. For example, the method 700 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 700 is described using steps in a specific sequence, it should be understood that the present disclosure contemplates that the described steps may be performed in different sequences than the sequence illustrated, and certain described steps may be skipped or not performed altogether.

At block 702, the application server 202 may receive and/or generate data sets based on a number of base stations 104 communicatively coupled to the wireless communication network 102. In some embodiments, the application server 202 may receive data sets equal to a number of base stations 104 within the wireless communication network 102. For example, the number of base stations 104 may include base stations directly coupled to the application server 202 and base stations indirectly (e.g., via one or more intermediary or intervening base stations 104) coupled to the application server 202. The application server 202 may transmit (block 704) the data and/or the data sets to the base stations 104. For example, the application server 202 may transmit a first data set to the first base station 104A and a second data set to the second base station 104B.

The first base station 104A may receive the first data set and may transmit (block 706) the first data set to a first set of active UEs 208. At block 708, the second base station 104B may receive the second data set and may transmit the second data set to a second set of active UEs 208. For example, the first active UE 208A may receive (block 710) the first data set and the second active UE 208B may receive (block 712) the second data set. The second active UE 208B may determine (block 714) whether the data has been received. If the second active UE 208B has not received the data (NO path of block 714), the second active UE 208B may request (block 716) additional data sets from one or more other active UEs 208. For example, the second active UE 208B may request the first data set from the first active UE 208A. The first active UE 208A may receive the request and may transmit (block 718) the first data set to the second set of active UEs 208. Additionally or alternatively, the first active UE 208A may transmit the first data set to the second set of active UEs 208 and/or another set of active UEs 208 in response to receiving the first data set. For example, the base station 104 may transmit an instruction to transmit the first data set to the second set of active UEs 208. Moreover, the second active UE 208B may transmit the second data set to the first set of active UEs 208 and/or another set of active UEs 208. The second active UE 208B may receive (block 720) the first data set and may assemble (block 722) the data based at least in part on the first data set and the second data set.

In some embodiments, the base stations 104 may split the data into one or more data sets. For example, a first base station 104A may split the data into data sets and may transmit and/or broadcast the data sets to other base stations 104B. Additionally or alternatively, the base stations 104 may transmit and/or broadcast the data and/or the data sets to the active UEs 208. The active UEs 208 may receive the data sets from the base stations 104. For example, the first active UE 208A may receive a first data set from the first base station 104A and the second active UE 208B may receive a second data set from the second base station 104B. The active UEs 208 may exchange the data sets between each other and each active UEs 208 may reassemble the data sets to form the data. Additionally or alternatively, the active UEs 208 may transmit the data and/or the data sets to the passive UEs 210 and the passive UEs 210 may reassemble the data sets to form the data.

With the foregoing in mind, FIG. 10 is a flowchart of a method 800 to download data to active user equipment 208 and passive user equipment 210 of the group of user equipment 206 of FIG. 4 using multiple base stations 104, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 700. In some embodiments, the method 700 may be implemented by executing instructions stored in a tangible, non-transitory, computer-readable medium, such as the one or more respective memories 14 or storages 16 of these devices, using the processors 12. For example, the method 700 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 700 is described using steps in a specific sequence, it should be understood that the present disclosure contemplates that the described steps may be performed in different sequences than the sequence illustrated, and certain described steps may be skipped or not performed altogether.

At block 802, the first base station 104A may receive a first data set. For example, the first base station 104A may receive data and may generate the first data set based on the data. The first base station 104A may transmit (block 804) the first data set to a first set of active UEs 208 that may include the first active UE 208A. At block 806, the first active UE 208A may receive the first data set and may transmit (block 808) the first data set to a first set of passive UEs 210.

The passive UEs 210 may receive (block 810) the first data set and may determine (block 812) whether the data has been received. If not all data sets have been received (NO path of block 812), the passive UEs 210 may request (block 814) additional data sets from one or more active UEs 208. For example, the second base station 104B may receive (block 816) and may transmit (block 818) a second data set to a second set of active UEs 208 that may include a second active UE 208B. The second active UE 208B may receive (block 820) the second data set. The second active UE 208B may transmit (block 822) the second data set to a second set of passive UEs 210. Additionally or alternatively, the second active UE 208B may transmit the second data set in response to receiving the second data set and/or an instruction from the wireless communication network 102 and/or the base station 104. In some embodiments, the second active UE 208B may transmit (block 824) the second data set based on the request from the passive UEs 210. The passive UEs 210 may receive the second data set and may assemble (block 826) the data based at least in part on the first data set and the second data set. If all data sets have been received (YES path of block 812), the passive UEs 210 may assemble the data based at least in part on the data sets.

Data transmission between the group of UE 206 and the wireless communication network 102 and/or between UEs 10 within the group of UE 206 may be implemented in different layers of various communication protocols. In some instances, the data may be split in the Packet Data Convergence Protocol (PDCP) dataplane layer. The PDCP layer of the access point may split the data into any number of data sets and may transfer the data and/or the data sets to two or more active UEs 208. The active UEs 208 receive the data and/or the data sets, transmit the data and/or the data sets, and aggregate the data and/or the data sets on the PDCP level. For upload, an active UE 208 may apply a PDCP duplication procedure and share a redundant copy of data with one or more other active UEs 208. Each active UE 208 may then transmit the same PDCP data to the base station 104. The base station 104 may then receive the data and transmit the data to the application server 202.

With the foregoing in mind, FIG. 11 is a block diagram of a model 900 of Open Systems interconnection (OSI) model layers of the UE 10, according to embodiments of the present disclosure. The UE 10 may receive data and/or any number of data sets from the wireless communication network 102 at the PDCP dataplane layer 902. Additionally, the UE 10 may transmit the data and/or the data sets to other UE 10 within the group 206 at the PDCP dataplane layer 902. As such, the UE 10 may transmit redundant copies of the data and/or the datasets to other active UEs 208 within the group 206. Accordingly, any active UEs 208 that receives the data and/or the data sets may transmit the same set of PDCP data to the wireless communication network 102 via the base stations 104. Moreover, the UEs 10 may assemble the data based on any number of data sets at the PDCP dataplane layer 902.

Additionally or alternatively, the UE 10 may receive data at the physical layer 904. The physical layer 904 may be associated with any number of physical connections between UEs 10 and any other computing devices. The UE 10 may also split the data into any number of data sets at the physical layer 904. As such, the UE 10 may transmit the data and/or the data sets to other UEs 10 within the group of UE 206. The UE 10 may transmit redundant copies of the data and/or the data sets to other active UEs 208 within the group 206. Accordingly, any active UEs 208 that receives the data and/or the data sets may transmit the same set of physical layer data to the wireless communication network 102. In certain embodiments, the base station 104 may receive the data sets and may assemble the data. In certain embodiments, the UE 10 may receive control messages at the physical layer 904. For example, the UE 10 may receive control messages that include downlink control data and/or uplink control data. The control messages may facilitate control of operations at the physical layer 904. Additionally, the UE 10 may transmit the control messages to other UEs within the group of UE 206.

In some embodiments, the UE 10 may receive control messages at the media access control (MAC) layer 906. The MAC layer 906 may include a sublayer of a data link layer. The MAC layer 906 may control hardware that facilitates interaction with wired, optical, and/or wireless transmission media. The control messages may include a MAC control element that may control one or more procedures for the UE 10. Any number of active UEs 208 may receive the control messages at the MAC layer 906. In certain embodiments, the control messages may include a set of UE identifiers. The UE 10 may utilize the UE identifiers to identify and transmit the control messages to other UEs within the group of UE 206. Additionally or alternatively, the active UEs 208 may transmit the control messages at the MAC layer 906 to all UEs within the group 206.

In certain embodiments, the UE 10 may receive control messages at the Radio Resource Control (RRC) layer 908. The control messages may include configuration data and may facilitate control of Access Stratum and non-Access Stratum procedures of the UE 10. In some embodiments, RRC control messages may include a set of device identifiers to assist the group of UE 206 in identifying UEs that may receive the RRC control messages. For example, a first active UE 208A may receive the RRC control messages and may select any number of active UEs 208 and/or passive UEs 210 as intended recipients of the RRC control message based on the set of device identifiers.

FIG. 12 is a flowchart of a method 1000 to download data at an internet protocol layer of the user equipment 10 of FIG. 1, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1000. In some embodiments, the method 1000 may be implemented by executing instructions stored in a tangible, non-transitory, computer-readable medium, such as the one or more respective memories 14 or storages 16 of these devices, using the processors 12. For example, the method 1000 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1000 is described using steps in a specific sequence, it should be understood that the present disclosure contemplates that the described steps may be performed in different sequences than the sequence illustrated, and certain described steps may be skipped or not performed altogether.

At block 1002, the application server 202 may transmit data to base station 104. The base station 104 may receive the data and may receive and/or generate (block 1004) data sets at an IP Network Layer. The base station 104 may transmit (block 1006) the data sets to a set of active UEs 208. For example, a first active UE 208A may receive (block 1008) the first data set at the IP Network Layer and the second active UE 208B may receive (block 1010) the second data set at the IP Network Layer. The second active UE 208B may determine (block 1012) whether all data sets have been received at the second active UE 208B. If not all data sets have been received (NO path of block 1012), the second active UE 208B may request (block 1014) the first data set from other active UEs 208, such as the first active UE 208A. The first active UE 208A may receive the request and may transmit (block 1016) the first data set to the second active UE 208B. The second active UE 208B may receive (block 1018) at the IP Network Layer and may assemble (block 1020) the data at the IP Network Layer based on the data sets. If all data sets have been received (YES path of block 1012), the second active UE 208B may assemble the data at the IP Network Layer based on the data sets.

In certain embodiments, the data may be split in a new sub-layer of the IP Network Layer protocol. The new layer may be defined as a Data Split and Scheduling Layer. The new layer may split the data into one or more data sets and map the data sets to IP addresses of one or more active UEs 208 within the group of UE 206. The base station 104 may receive the data and/or the data sets and may transmit the data and/or the data sets to a set of active UEs 208 based on the mapping. The active UEs 208 may receive the data sets and may cooperate and coordinate with other UEs within the group of UEs 206 to transmit the data sets based on the mapping. The active UEs 208 may assemble the data based on the data sets.

FIG. 13 is a block diagram of IP network layers of the application server 202, according to embodiments of the present disclosure. The application layer 1102 may specify shared communications protocols and/or interface methods that may be utilized in a communications network, such as the wireless communications network 102. In certain embodiments, the application layer 1102 may utilize Hypertext Transfer Protocol (HTTP), Domain Name System (DNS), Transport Layer Security (TLS), and any other suitable communication protocol. The transport layer 1104 may specify transport protocols that provide end-to-end communication services, such as connection-oriented communication, reliability, flow control, multiplexing, and so forth, for various applications. As such, the transport layer 1104 may facilitate delivery of data to appropriate applications executing on the UE 10. The transport layer 1104 may utilize the transmission control protocol (TCP), the User Datagram Protocol), the Datagram Congestion Control Protocol (DCCP), the Stream Control Transmission Protocol (SCTP) and any other suitable transport protocol. The network layer 1106 may specify protocols, methods, and specifications that facilitate transportation of network packets from UEs 10 and across boundaries of the communication network. The network layer 1106 may utilize Internet Protocol (IP), Internet Protocol version 4 (IPv4), Internet Protocol version 6 (IPv6), and any other suitable network protocol. The network layer 1106 may include any number of sublayers, such as a data split and scheduling layer 1108. The application server 202 may split the data into any number of data sets at the data split and scheduling layer 1108. Additionally, the application server 202 may generate a mapping between the data sets and any number of IP addresses associated with active UEs 208 of the group of UE 206. For example, the application server 202 may map one or more data sets to each IP address. Additionally or alternatively, the application server 202 may map one or more data sets to IP addresses that correspond to a set of active UEs 208. In certain embodiments, the application server 202 may map the same data sets to multiple active UEs 208. As such, the base station 104 may transmit the same data sets to two active UEs 208, three active UEs 208, and so forth. Accordingly, the base station 104 may transmit the data sets and/or the data based on the mapping.

With the foregoing in mind, FIG. 14 is a flowchart of a method 1200 to download data using Internet Protocol (IP) addresses of active user equipment 208 of the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1200. In some embodiments, the method 1200 may be implemented by executing instructions stored in a tangible, non-transitory, computer-readable medium, such as the one or more respective memories 14 or storages 16 of these devices, using the processors 12. For example, the method 1200 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1200 is described using steps in a specific sequence, it should be understood that the present disclosure contemplates that the described steps may be performed in different sequences than the sequence illustrated, and certain described steps may be skipped or not performed altogether.

At block 1202, the application server 202 may receive and/or generate data and/or data sets at an IP Network Layer. The application server 202 may map (block 1204) the data sets to corresponding IP addresses of active UEs 208 within a group of UE 206. At block 1206, the application server 202 may transmit the data sets and/or the mapping to the base station 104. As such, the base station 104 may receive the data sets and the mapping and may transmit (block 1208) the data sets to active UEs 208 based on the mapping. For example, the base station 104 may transmit a first data set to a first set of active UEs 208, a second data set to a second set of active UEs 208, a third data set to a third set of active UEs 208, and so forth.

Accordingly, the first active UE 208A may receive (block 1210) a first data set and the second active UE 208B may receive (block 1212) the second data set. The second active UE 208B may determine (block 1214) whether all data sets have been received. If not all data sets have been received (NO path of block 1214), the second active UE 208B may request (block 1216) the first data set from a set of active UEs 208. For example, the first active UE 208A may receive the request and may transmit (block 1218) the first data set to one or more active UEs 208, such as the second active UE 208B based on the request. The second active UE 208B may receive (block 1220) the first data set and may assemble (block 1222) the data based at least in part on the first data set and the second data set.

The data may be steered to particular active UEs 208. For example, the application server 202 may determine a first data set to transmit to the first active UE 208A, a second data set to transmit to the second active UE 208B, and so forth. Additionally or alternatively, a first base station 104A may determine a third data set to transmit to a second base station 104B based on a connection status between the second base station 104B and the application server 202.

With the foregoing in mind, FIG. 15 is a flowchart of a method 1300 to download data using the first base station 104A communicatively coupled to the application server 202 and a second base station 104B disconnected from the application server 202 of the wireless communication network 102 of FIG. 3, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1300. In some embodiments, the method 1300 may be implemented by executing instructions stored in a tangible, non-transitory, computer-readable medium, such as the one or more respective memories 14 or storages 16 of these devices, using the processors 12. For example, the method 1300 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1300 is described using steps in a specific sequence, it should be understood that the present disclosure contemplates that the described steps may be performed in different sequences than the sequence illustrated, and certain described steps may be skipped or not performed altogether.

At block 1302, the first base station 104A may receive data and/or data sets from the application server 202. For example, the first base station 104A may receive the data and may generate the data sets based on a number of other base stations 104 included in the wireless communication network 102. The first base station 104A may determine (block 1304) the second base station 104B is disconnected from the application server 202. That is, the first base station 104A may act as an intervening or intermediary base station 104 to permit communication between the second base station 104B and the application server 202. The first base station 104A may transmit (block 1306) the first data set to a first set of active UEs 208. For example, the first active UE 208A may receive (block 1308) the first data set and may transmit (block 1310) the first data set to a set of active UEs 208, a set of passive UEs 210, or a combination thereof. For example, the first active UE 208A may transmit the first data set to the second active UE 208B.

Additionally or alternatively, the first base station 104A may transmit (block 1312) the second data set to a set of base stations 104, such as second base station 104B. The second base station 104B may receive (block 1314) the second data set from the first base station 104A. The second base station 104B may also transmit (block 1316) the second data set to a second set of active UEs 208, such as the second active UE 208B. As such, the second active UE 208B may receive (block 1318) the first data set and the second data set. Accordingly, the second active UE 208B may assemble (block 1320) the data based at least in part on the first data set and the second data set.

Active UEs 208 may be controlled using control channels due to the direct connection to the base station 104. Passive UEs 210 have an indirect connection and may require an updated control channel path. Control channels provide configuration data to UEs 10 for paging the UEs 10 and scheduling data reception and transmission. Active UEs 208 may identify that a paging message, a configuration message, and/or control data is intended for passive UEs 210. The active UEs 208 may perform the identification based on an identifier associated with a protocol layer format. A MAC Control Element (MAC CE) may be utilized as an identifier. In some instances, the MAC CE may be applicable for all UEs 10 within the group of UE 206 and may be received by the first active UE 208A and transmitted to any number of other active UEs 208 and passive UEs 210. In another instance, the MAC CE may be applicable to passive UEs 210 only. A Radio Resource Control (RRC) message may provide configuration data to UEs 10. The base station 104 may transmit the RRC message to active UEs 208 that may transmit the message to other active UEs 208 and/or passive UEs 210. Responses may be transmitted to the base station 104 via the active UEs 208. Downlink Control Information (DCI) and Uplink Control Information (UCI) may be utilized to control the physical layer operation.

With the foregoing in mind, FIG. 16 is a flowchart of a method 1400 to download control messages to active user equipment 208 and passive user equipment 210 of the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1400. In some embodiments, the method 1400 may be implemented by executing instructions stored in a tangible, non-transitory, computer-readable medium, such as the one or more respective memories 14 or storages 16 of these devices, using the processors 12. For example, the method 1400 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1400 is described using steps in a specific sequence, it should be understood that the present disclosure contemplates that the described steps may be performed in different sequences than the sequence illustrated, and certain described steps may be skipped or not performed altogether.

At block 1402, the base station 104 may transmit a control message to a first set of active UEs 208. For example, the base station 104 may transmit the control message to the first active UE 208A that is communicatively coupled to the base station 104. The first active UE 208A may receive (block 1404) the control message and may perform an operation based on the control message. For example, the first active UE 208A may utilize the control message to control a procedure. In certain embodiments, the control message may include a set of UE identifiers that may indicate recipients (e.g., one or more active UEs 208, one or more passive UEs 210, or a combination thereof) for the control message. As such, the first active UE 208A may transmit (block 1406) the control message to a second set of active UEs 208 based on the set of UE identifiers and may also transmit (block 1408) the control message to a set of passive UEs 210 based on the set of UE identifiers. The set of passive UEs 210 may receive (block 1410) the control message and may perform an operation based on the control message. Additionally, the second active UE 208B may receive (block 1412) the control message and may transmit (block 1414) the control message to a second set of passive UEs 210 based on the set of device identifiers. As such, the group of UE 206 may coordinate and cooperate to receive and transmit control messages from a communication network and transmit the control messages to intended UEs based on a set of UE identifiers included in the control message.

In some embodiments, the UEs 10 may utilize criteria for entering and/or leaving the group of UE 206. The criteria may include a network signal quality of the UEs 10, a power connection, a battery level of the UEs 10, a time window, a geographic area of the UEs 10, UE capabilities, a device-to-device connection, a trust level between UEs 10, and so forth. In certain embodiments, the UE 10 may be at an edge of the coverage area for the wireless communication network 102. The network signal quality of the UE 10 may be compared to a threshold. When below the threshold, there may be a risk that service is interrupted. If another UE 10 or the group of UE 206 are in close proximity, the UE 10 may attempt to form a group or enter the group of UE 206. If a UE 10 is connected to electrical power, it may no longer require the benefits of shared resources within a group and may leave the group. Alternatively, when connected to electrical power, the UE 10 may receive additional tasks within the group. Moreover, the UE 10 may instruct other UEs within the group to enter a power-saving mode when the UE 10 is connected to electrical power. As such, the other UEs may offload tasks to the UE 10 with the highest battery level and/or the UE 10 that is currently connected to electrical power. Additionally or alternatively, the UE 10 may compare the battery level to a battery threshold. For example, when below the threshold, the UE 10 may search for and/or join the group in order to offload tasks and enter a power-saving mode. Alternatively, when above the threshold, the UE 10 may exit the power-saving mode and may leave the group.

In certain embodiments, the UEs 10 may search for and/or enter one or more groups based on a current time. For example, the UE 10 may receive an input indicative of a particular time period when group search and/or group formation is permitted. Additionally or alternatively, the UE 10 may search for and/or enter groups based on a current location of the UE 10. For example, the UE 10 may determine the UE 10 is within a particular location, such as a home or office, and/or may detect other known UEs within proximity (e.g., distance threshold, communication threshold, local network) of the UE 10. Additionally, the UE 10 may determine the current location of the UE 10 is outside of the particular location and may request and leave the group. In some embodiments, the UE 10 may have limited capabilities compared to other UEs within proximity of the UE 10. For example, the UE 10 may support fewer RATs, may support fewer frequency bands for radio communication, may support fewer local communication technologies, and the like. As such, the UE 10 may search for and enter the group to provide additional coverage and efficiency for data transfer and reception.

A UE 10 that lacks radio technology or does not support particular frequencies may search for and enter a group of UE 206 with additional and/or greater UE capabilities. Additionally, the UE 10 may determine whether the UE capabilities permit the UE 10 to communicate with other UEs 10 in the group of UE 206. The UE 10 may determine whether a stable device-to-device connection is available with one or more UEs 10 in the group of UE 206 based on the Received Signal Strength (RSSI) and signal to noise ratio (SNR), or any other suitable signal characteristics. UE trust may be established based on previously entering the group of UE 206. Additionally, the UE 10 may determine a data rate of the local connection to the group of UE 206 and may compare the data rate to a threshold data rate. For example, certain applications may necessitate higher data rates for data communication. As such, the UE 10 may determine whether the local connection with the group 206 satisfies a data communication criteria (e.g., meets or exceeds the threshold data rate). If the UE and/or group capabilities meet or exceed any number of criteria, the UE 10 may request and join the group of UE 206. Alternatively, if any of the UE and/or group capabilities fail to satisfy any number of criteria, the UE 10 may not join the group and/or may request and leave the group.

The UE 10 may also determine a trust level associated with one or more UEs within the group of UE 206 and/or a trust level of the group of UE 206. For example, the UE 10 may have previously joined a group with one or more of the UEs, may have previously shared data with one or more of the UEs, may have previously connected to the same local network, may currently be connected to the same local network, and so forth. Additionally, the UE 10 may determine whether any other UEs are previously known, such as based on a previous local network connection, a shared account, and the like. In some embodiments, the UE 10 may receive an input indicative of one or more user preferences for group membership, such as group formation, group entry, group exit, UE roles (e.g., primary UE, active UE, passive UE), UE tasks, and the like. For example, the UE 10 may receive input indicative of particular geographic areas, particular local networks, particular time of day, particular days, and the like for group membership. Additionally or alternatively, the UE 10 and/or the group of UE 206 may utilize signatures to determine trust levels and form, enter, and/or leave a group. In some embodiments, a machine learning model may be utilized to determine group formation, group entry, group exit, UE roles, and the like based on any number of criteria described herein. The machine learning model may be trained based on training data including previous group formations, group entries, group exits, UE roles, and the like.

Entering a group of UE 206 may begin with group discovery. One or more UEs 10 (e.g., active UEs 208) within the group of UE 206 may transmit reference signals on a local communications frequency. The reference signals may be specialized wake-up signals optimized for low power consumption. UE 10 outside the group of UE 206 may periodically search for and try to detect the reference signals. The UE 10 can measure the reference signals and join the group of UE 206. The next step of entering the group of UE 206 includes establishing device-to-device connections. The device-to-device connection may be direct or through a local network connection (e.g., wired, wireless, Ethernet, Wi-Fi, peer-to-peer, or any other suitable local network connection). The UE 10 may also exchange UE capabilities. The UE capabilities may be utilized to determine preferred communication frequencies, the types of communication technologies of the group of UE 206 and the new UE 10, a current battery status of the UE 10, a current thermal status of the UE 10, and so forth. Each UE 10 may periodically send a keep alive message to at least one active UE 208 in the group of UE 206.

To maintain the group of UE 206, the number of passive UEs 210 may be controlled. For example, if an active UE 208 leaves coverage of the wireless communication network 102 and/or the base station 104, the active UE 208 may be reassigned as a passive UE 210. Additionally or alternatively, an active UE 208 may fall below a battery threshold and a new active UE 208 may be assigned. The active UEs 208 may receive regular updates from other UEs 10 in the group regarding battery status, thermal status, and link status of the UE 10. At least one of the active UE 208 may additionally be assigned as a primary UE. The primary UEs may maintain a list of candidates from the active UEs 208 to be assigned as a new primary UE. The primary UEs may send a request to one of the candidates to become a new primary UE. Additionally or alternatively, a candidate UE may send a request to assign the candidate UE as a new primary UE. One or more current primary UEs may transmit a signal to assign the candidate UE as a new primary UE. For example, the current primary UE may transmit the signal to a portion of the UEs within the group of UEs.

With the foregoing in mind, FIG. 17 is a flowchart of a method 1500 to establish connection with the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1500. In some embodiments, the method 1500 may be implemented by executing instructions stored in a tangible, non-transitory, computer-readable medium, such as the one or more respective memories 14 or storages 16 of these devices, using the processors 12. For example, the method 1500 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1500 is described using steps in a specific sequence, it should be understood that the present disclosure contemplates that the described steps may be performed in different sequences than the sequence illustrated, and certain described steps may be skipped or not performed altogether.

At block 1502, the first active UE 208A may transmit and/or broadcast a reference signal. In certain embodiments, the first active UE 208A may periodically transmit and/or broadcast the reference signal. Additionally or alternatively, the first active UE 208A may transmit and/or broadcast the reference signal based on detection of other nearby UEs 10. The UEs 10 may receive (block 1504) the reference signal and may measure the reference signal. The UEs 10 may transmit (block 1506) and/or broadcast a set of attributes associated with the UEs 10. For example, the UEs 10 may transmit UE capabilities and/or UE statuses associated with the UEs. The first active UE 208A may receive (block 1508) the set of UE attributes and may receive (block 1510) a set of group criteria. For example, the first active UE 208A may retrieve the set of group criteria from the memory 14 and/or the storage 16. Additionally or alternatively, another active UE 208, such as a primary UE of the group of UE 206, may transmit and/or broadcast the set of group criteria. As such, the first active UE 208A may receive the set of group criteria from another active UE 208.

At block 1512, the first active UE 208A may determine whether any number of the set of UE attributes satisfy the set of group criteria. In some embodiments, the set of group criteria may include a communication technology criterion. The communication technology criterion may indicate any number of acceptable communication technologies that provide communication between the UE within the group of UE 206. As such, UE 10 requesting to join the group of UE 206 may include at least one of the acceptable communication technologies to satisfy the communication technology criterion. As another example, the set of group criteria may include a location criterion. The location criterion may indicate whether any UEs 10 requesting entry to the group of UE 206 are located within a particular geographic area and/or within a threshold distance from any UEs within the group of UE 206. Additionally or alternatively, the set of group criteria may include a signal strength criterion. For example, the signal strength criterion may include a threshold signal strength and the first active UE 208A may compare the RSSI and/or the signal-to-noise ratio from the requesting UE 10 to the threshold signal strength to determine satisfaction of the signal strength criterion. Moreover, the set of group criterion may include a network connection criterion that may indicate any number of acceptable local network connections for requesting UEs 10. The first active UE 208A may receive information including a list of active local network connections from the requesting UEs 10 and may compare the list with the acceptable local network connections. Additionally or alternatively, the first active UE 208A may determine whether the requesting UEs 10 are capable of establishing a local network connection based on the communication technologies of the requesting UEs 10. Accordingly, the first active UE 208A may determine satisfaction of the network connection criterion based on active connections of the requesting UEs 10 and/or network connection capabilities of the requesting UEs 10.

If the UE attributes satisfy the group criteria (YES path of block 1512), the first active UE 208A may establish (block 1514) a connection with the requesting UE 10. For example, the first active UE 208A may establish a device-to-device connection with the requesting UE 10. Additionally or alternatively, the first active UE 208A may establish a local network connection with the requesting UE 10 or any other suitable connection. In certain embodiments, the first active UE 208A may determine a number of group criteria satisfied by the UE attributes and may establish the connection based on satisfaction of a threshold number of group criteria. Alternatively, the first active UE 208A may establish the connection based on satisfaction of a single group criterion or all group criteria If the UE attributes fail to satisfy (NO path of block 1512) the group criteria (e.g., one criterion, a threshold number of criterion, the set of group criterion, and so forth), the first active UE 208A may return to block 1502 and transmit the reference signal. For example, the first active UE 208A may periodically transmit the reference signal. Additionally or alternatively, the first active UE 208A may transmit a notification indicative of denying the request to establish and/or join the group of UE 206. The UE 10 may receive the notification and may display the notification on the display 18. In some embodiments, the notification may indicate one or more failed group criteria.

With the foregoing in mind, FIG. 18 is a flowchart of a method 1600 to download paging messages for the group of user equipment 206 of FIG. 4, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1600. In some embodiments, the method 1600 may be implemented by executing instructions stored in a tangible, non-transitory, computer-readable medium, such as the one or more respective memories 14 or storages 16 of these devices, using the processors 12. For example, the method 1600 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1600 is described using steps in a specific sequence, it should be understood that the present disclosure contemplates that the described steps may be performed in different sequences than the sequence illustrated, and certain described steps may be skipped or not performed altogether.

At block 1602, a first set of active UEs 208 may transmit a corresponding set of paging identifiers. Each paging identifier may identify a corresponding active UE 208. The first active UE 208A may receive (block 1604) the set of paging identifiers and may store the set of paging identifiers. Additionally or alternatively, a set of passive UEs 210 may transmit (block 1606) a corresponding second set of paging identifiers. Each paging identifier of the second set of paging identifiers may identify a corresponding passive UE 210. The first active UE 208A may receive (block 1608) the second set of paging identifiers and may store the second set of paging identifiers.

The first active UE 208A may receive (block 1610) a paging message. For example, the first active UE 208A may periodically monitor for incoming paging messages from the wireless communication network 102. In certain embodiments, the paging message may provide notification of an incoming call or an information change. The first active UE 208A may determine the paging message is addressed to a set of UEs 10 in the group of UE 206. For example, the paging message may include a set of paging identifiers and the first active UE 208A may retrieve and compare with the stored paging identifiers. As such, the first active UE 208A may determine a set of target UEs based on the paging identifiers included with the paging message. Accordingly, the first active UE 208A may transmit (block 1612) the paging message to the set of UEs 10 based on the set of paging identifiers associated with the paging message.

As such, the first active UE 208A may act as a paging UE for any number of UEs within the group 206. For example, a set of active UEs 208 and/or set of passive UEs 210 may transmit corresponding paging identifiers to the first active UE 208A. Additionally, the set of active UEs 208 and/or set of passive UEs 210 may enter an idle mode (e.g., cease monitoring for paging messages) in order to reduce power consumption. The paging UEs (e.g., the first active UE 208A) may then wake up (e.g., send a wake-up signal to) or otherwise activate the UE(s) (e.g., of the set of active UEs 208 and/or set of passive UEs 210) for which the paging message is intended. Accordingly, cooperation and coordination between the group of UE 206 may reduce power consumption for any number of the UEs by offloading paging to one or more active UEs 208.

With the foregoing in mind, FIG. 19 is a flowchart of a method 1700 to download radio bearers to the group of user equipment 206 of FIG. 4 using the wireless communication network 102 of FIG. 3, according to embodiments of the present disclosure. Any suitable device (e.g., a controller) that may control components of the network 102, the base stations 104, the application server 202, the group of user equipment (UE) 206, the active UEs 208, and/or the passive UEs 210, such as one or more respective processors 12 of these devices, may perform the method 1700. In some embodiments, the method 1700 may be implemented by executing instructions stored in a tangible, non-transitory, computer-readable medium, such as the one or more respective memories 14 or storages 16 of these devices, using the processors 12. For example, the method 1700 may be performed at least in part by one or more software components, such as one or more respective operating systems of the network 102, the base stations 104, the application server 202, the group of user equipment (UE) 206, the active UEs 208, and/or the passive UEs 210, one or more software applications of the network 102, the base stations 104, the application server 202, the group of user equipment (UE) 206, the active UEs 208, and/or the passive UEs 210 and the like. While the method 1700 is described using steps in a specific sequence, it should be understood that the present disclosure contemplates that the described steps may be performed in different sequences than the sequence illustrated, and certain described steps may be skipped or not performed altogether.

At block 1702, the application server 202 may receive and/or generate data. In certain embodiments, the data may include a first radio bearer and a second radio bearer. In certain embodiments, a bearer service includes a link between two points that is defined by a set of characteristics. Services, such as RATs and/or local networks, provided to UEs 10 are associated with a radio bearer that specifies the configuration for the data link layer (e.g., layer 2) and the physical layer. As such, the radio bearer may facilitate defining the quality of service (QoS) that provides a description or measurement of the overall performance of the service. Radio bearers may include channels provided by the data link layer to higher layers (e.g., the network layer, the transport layer, the application layer, and so forth) to facilitate transfer of user and/or control data. As such, the data link layer may provide information transmission as a service between the UE and the wireless communication network 102 via the radio bearers and signaling radio bearers. Accordingly, the radio bearers may function as access points between the data link layer and the upper layers. In certain embodiments, the first radio bearer may be associated with signaling data. For example, the first radio bearer may include a Signaling Radio Bearer (SRB) that carries signal data. The UEs 10 may utilize the SRB during connection establishment. The SRB may facilitate establishing Radio Access Bearers (RABs) and may also provide signaling data during connection with the wireless communication network 102, such as to perform a handover, reconfiguration, release, and any other suitable signaling procedure. The application server 202 may transmit (block 1704) the data to the first base station 104A. The first base station 104A may receive (block 1706) the first radio bearer associated with the signaling data and may receive (block 1708) the second radio bearer. The first base station 104A may determine (block 1710) the second base station 104B is disconnected from the application server 202. For example, the second base station 104B may be indirectly communicatively coupled to the application server 202 via the first base station 104A. The first base station 104A may transmit (block 1712) the first radio bearer to a first set of base station 104 that may include the second base station 104B. In certain embodiments, the first set of base station 104 may include any base station that is disconnected from the application server 202.

The second base station 104B may receive the first radio bearer and may transmit (block 1714) the first radio bearer to a first set of active UEs 208. Additionally, the first base station 104A may transmit (block 1716) the second radio bearer to a second set of active UEs 208. The active UEs 208 may receive and transmit the first and second radio bearers to other active UEs 208 within the group 206. Moreover, the active UEs 208 may transmit (block 1718) the first radio bearer and the second radio bearer to the passive UEs 210 within the group 206. For example, the active UEs 208 may transmit the first radio bearer to a first set of passive UEs 210 and may transmit the second radio bearer to a second set of passive UEs 210. The passive UEs 210 may receive (block 1720) the first radio bearer and the second radio bearer. In certain embodiments, the first passive UE 210A may receive the first radio bearer and the second passive UE 210B may receive the second radio bearer. Accordingly, the active UEs 208, the passive UEs 210, or a combination thereof may cooperate and coordinate to transmit the first radio bearer and the second radio bearer to each UE 10 within the group 206.

In an embodiment, a method includes receiving, a request for data from a target user equipment at a first user equipment of a group of user equipments. The group of user equipments includes the target user equipment. The method also includes receiving a first set of the data from a first base station at the first user equipment. The first base station may receive the first set from a server. The method also includes receiving a second set of the data from a second base station at the first user equipment. The first base station may receive the second set from the server. The method may also include assembling, at the first user equipment, the data based at least in part on the first set and the second set and transmitting, from the first user equipment, the first set, the second set, the data, or any combination thereof to the target user equipment. The target user equipment may be disconnected from the first base station, the second base station, or both.

The method may also include receiving, via a device-to-device communication link from a second user equipment, a third set of the data at the first user equipment. The second user equipment may be communicatively coupled to the first base station, the second base station, or both. Additionally, the group of user equipments may include the second user equipment. The method may also include assembling, at the first user equipment, the data based at least in part on the first set, the second set, and the third set.

Additionally, transmitting, from the first user equipment, the data to the target user equipment may include transmitting, via a device-to-device communication link, the first set, the second set, the data, or any combination thereof to the second user equipment and causing the second user equipment to send the data to the target user equipment.

The method may also include causing the second user equipment to assemble the data based at least in part on the first set, the second set, and the third set. The method may also include receiving, at the first user equipment, second data, transmitting, via device-to device communication to a second user equipment, a set of the second data, and causing the second user equipment to send the set of the second data to the first base station, the second base station, or both.

The method may also include transmitting, from the first user equipment, the second data, the set of the second data, or both to the first base station, the second base station, or both. The second data may be received at the first user equipment via the device-to-device communication link from a third user equipment.

The method may also include transmitting, via the device-to-device communication link to the second user equipment, the second data and causing the second user equipment to send the second data to the first base station, the second base station, or both.

The method may also include receiving routing information associated with the data, wherein the routing information includes a path for transmission of the data to the target user equipment. The method may also include receiving a first set of user equipment to receive the data based on the routing information. The method may also include transmitting the data to the first set of user equipment based on the routing information.

In another embodiment, a method may include receiving, at a base station, a request for data and receiving, at the base station, the data from a server, transmitting a first set of the data to a first user equipment communicatively coupled to the base station. A group of user equipments may include the first user equipment. The method may also include transmitting a second set of the data to a second user equipment communicatively coupled to the base station. The group of user equipments may include the second user equipment. The method may also include causing the first user equipment to send, via a device-to-device communication link, the first set of the data to a target user equipment that is disconnected from the base station. The group of user equipments may include the target user equipment. The method may also include causing the second user equipment to send, via a device-to-device communication link, the second set of the data to the target user equipment.

The method may also include transmitting the second set of the data to the first user equipment and causing the first user equipment to send, via a device-to-device communication link, the second set of the data to the target user equipment.

The method may also include receiving, at the base station, a third set of second data from the first user equipment; receiving, at the base station, a fourth set of second data from the second user equipment; and generating, at the base station, the second data based at least in part on the third set of the second data, the fourth set of the second data, or a combination thereof.

The third set of second data may be received at the first user equipment from a third user equipment that is disconnected from the base station. The group of user equipments may include the third user equipment.

The method may also include receiving, at the base station, third data from the first user equipment and receiving, at the base station, the third data from the second user equipment. A fifth set of the third data may be received at the second user equipment via a device-to-device communication link from the first user equipment.

A sixth set of the third data may be received at the first user equipment via a device-to-device communication link from the second user equipment. The method may also include receiving, at the base station, the first set of the data and the second set of the data based at least in part on the data.

In yet another embodiment, a method includes receiving, at a first user equipment communicatively coupled to a base station, a first data and receiving, at the first user equipment, a first set of the first data and a second set of the first data. The method also includes transmitting the first set, the second set, the first data, or any combination thereof to the base station and transmitting, via device-to device communication to a second user equipment communicatively coupled to the base station, the first set, the second set, the first data, or any combination thereof. The method also includes causing the second user equipment to send the first set, the second set, the first data, or any combination thereof to the base station.

The method may also include transmitting the first set, the second set, the first data, or any combination thereof to a second base station. The first user equipment may be communicatively coupled to the second base station. The method may also include receiving, at the first user equipment, a third set of a second data and transmitting the third set to the base station. A fourth set of the second data is received at the base station from a third user equipment communicatively coupled to the base station.

The method may also include splitting, at the first user equipment, the first data into the first set and the second set. The method may also include transmitting the first data to the base station and transmitting, via a device-to-device communication link to the second user equipment, the first data. The method may also include causing the second user equipment to send the first data to the base station. The first data may be received at the first user equipment via a device-to-device communication link from a third user equipment that is disconnected from the base station.

In yet another embodiment, a method includes receiving, at a first base station, data from a server based on a request associated with a group of user equipments and determining, at the first base station, that a second base station is disconnected from the server. The method also includes transmitting, from the first base station, a first set of the data to a first user equipment communicatively coupled to the first base station. The group of user equipments may include the first user equipment. The method also includes transmitting, from the first base station, a second set of the data to the second base station communicatively coupled to the first user equipment. The second base station may transmit the second set to the first user equipment.

The method may also include receiving, at the first base station, the first set and the second set and transmitting, from the first base station, the second set to the first user equipment.

The method may also include causing the second base station to transmit the second set to a second user equipment communicatively coupled to the second base station. The group of user equipments may include the second user equipment.

The method may also include causing the first user equipment to transmit, via a device-to-device communication link, the first set to the second user equipment.

The method may also include transmitting, from the first base station, the data to the second base station and causing the second base station to send the data to a third user equipment communicatively coupled to the second base station. The group of user equipments may include the third user equipment.

The method may also include causing a third base station to transmit the data to a fourth user equipment communicatively coupled to the third base station. The group of user equipments may include the fourth user equipment. The data may be received at the third base station from the server.

The method may also include splitting, at an internet protocol network layer of the first base station, the data into the first set and the second set.

In yet another embodiment, a method includes receiving, at a first user equipment, a first set of data from a first base station. The first base station may receive the first set from a server. The method also includes receiving, at the first user equipment, a second set of the data via a device-to-device communication link from a second user equipment. The second user equipment may receive the second set from a second base station. The method also includes assembling, at the first user equipment, the data based at least in part on the first set and the second set.

The method may also include receiving, at an internet protocol layer of the first user equipment, the first set and the second set.

The method may also include aggregating, at the internet protocol layer, the set of data based at least in part on the first set and the second set.

The second base station may be disconnected from the server.

The second base station may receive the second set from the first base station.

The second base station may receive the second set from the server.

The second base station may receive the data from the server.

The method may also include receiving, at a first user equipment of a group of user equipments, data from a base station and receiving, at the first user equipment, a control element that includes a user equipment identifier associated with a set of user equipment of the group of user equipments. The set of user equipment may include at least one user equipment that is disconnected from the base station. The method may also include transmitting, based on the user equipment identifier, a first set of the data to the set of user equipment.

The method may also include generating, at an internet protocol network layer of the first user equipment, the first set of the data based at least in part on the user equipment identifier.

The method may also include receiving, at the first user equipment, a second control element that includes a second user equipment identifier associated with a second set of user equipment. The group of user equipments may include the second set of user equipment. The method may also include transmitting the second control element to the second set of user equipment based on the second user equipment identifier.

The method may also include transmitting the control element to the set of user equipment based on the user equipment identifier.

The method may also include transmitting the control element to a second user equipment based on the user equipment identifier and causing the second user equipment to transmit the control element to the at least one user equipment. The set of user equipment may include the second user equipment.

The method may also include receiving, at the first user equipment, a third control element associated with a third set of user equipment of the group of user equipments The third set of user equipment may receive the third control element from the base station.

In yet another embodiment, a method includes receiving a set of membership criteria associated with a group of user equipments and receiving a set of user equipment attributes associated with a user equipment. The method also includes receiving a reference signal associated with the group of user equipments based on the set of membership criteria and at least one of the set of user equipment attributes and establishing a connection with at least one user equipment of the group of user equipments based on the reference signal.

The method may also include transmitting the set of user equipment attributes to the at least one user equipment based on establishing the connection and receiving a set of group attributes associated with the group of user equipments.

The set of group attributes may include a set of communication frequencies, a set of communication protocols, or both.

The method may also include transmitting a keep-alive request to the at least one user equipment based on an elapsed time from establishing the connection exceeding a threshold time period.

The method may also include transmitting an exit request to the at least one user equipment; and causing the at least one user equipment to terminate the connection.

The set of user equipment attributes may include a battery level associated with the user equipment, a geographical location associated with the user equipment, a power connection associated with the user equipment, or any combination thereof. The set of criteria may include a battery threshold, an electrical power connection, a time window, a geographical area, a set of user equipment capabilities, or any combination thereof.

The connection may include a user equipment-to-user equipment connection, a network connection, or both.

In yet another embodiment, a method includes receiving, at a first user equipment of a group of user equipments, a set of paging identifiers associated with a set of user equipment of the group of user equipments and receiving, at the first user equipment, a first paging message associated with at least one user equipment of the set of user equipment. The method also includes transmitting, via user equipment-to-user equipment communication, the first paging message to at least one user equipment of the at least one user equipment based on the set of paging identifiers.

The first user equipment may include a first Subscriber Identification Module (SIM) card associated with a first carrier and a second SIM card associated with a second carrier.

The method may also include receiving, at the first user equipment, a first set of data from a first base station associated with the first carrier and receiving, at the first user equipment, a second set of data from a second base station associated with the second carrier.

The second base station may be disconnected from a server.

The second base station may receive the second set of data from the first base station.

The method may also include receiving, at the first user equipment, a paging identifier associated with a second user equipment. The group of user equipments may include the second user equipment.

The method may also include receiving, at the first user equipment, a second paging message and transmitting the second paging message to the second user equipment based at least in part on the paging identifier and the second paging message.

In yet another embodiment, a method includes receiving, at a first base station associated with a first carrier, a first set of data from a server. The first set may include a first radio bearer associated with signaling data. The method also includes transmitting the first set of data to a user equipment communicatively coupled to the first base station. The user equipment may receive a second set of data user equipment from a second base station associated with a second carrier. The second set may include a second radio bearer.

The method may also include receiving, at the first base station, the data from the server and determining, at the first base station, that the second base station is disconnected from the server. The method may also include transmitting the second set to the second base station.

The method may also include causing the second base station to send the second set to the user equipment.

The method may also include determining, at the first base station, the user equipment is disconnected from the first base station and determining, at the first base station, the user equipment is communicatively coupled to the second base station. The method may also include transmitting the first set to the second base station.

The method may also include causing the second base station to transmit the first set to the user equipment.

The second base station may receive the second set from the server.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method, comprising:
    receiving, at a first user equipment of a group of user equipments, a request for data from a target user equipment, wherein the group of user equipments comprises the target user equipment;
    receiving, at the first user equipment, a first data set associated with the data from a first base station, the first base station configured to receive the first data set from a server;
    receiving, at the first user equipment, a second data set associated with the data from a second base station, the first base station configured to receive the second data set from the server;
    assembling, at the first user equipment, the data based at least in part on the first data set and the second data set; and
    transmitting, from the first user equipment to the target user equipment, the target user equipment being disconnected from the first base station, the second base station, or both.

2. The method of claim 1, comprising:
    receiving, via a device-to-device communication link from a second user equipment, a third data set associated with the data at the first user equipment, the second user equipment being communicatively coupled to the first base station, the second base station, or both, the group of user equipments comprising the second user equipment; and
    assembling, at the first user equipment, the data based at least in part on the first data set, the second data set, and the third data set.

3. The method of claim 2, wherein transmitting, from the first user equipment, the data to the target user equipment comprises:
    transmitting, via the device-to-device communication link, the first data set, the second data set, the data, or any combination thereof to the second user equipment, and
    causing the second user equipment to send the data to the target user equipment.

4. The method of claim 2, comprising causing the second user equipment to assemble the data based at least in part on the first data set, the second data set, and the third data set.

5. The method of claim 1, comprising:
    receiving, at the first user equipment, second data;
    transmitting, via a device-to-device communication link to a second user equipment, a data set associated with the second data; and
    causing the second user equipment to send the data set associated with the second data to the first base station, the second base station, or both.

6. The method of claim 5, comprising transmitting, from the first user equipment, the second data, the data set of the second data, or both to the first base station, the second base station, or both, wherein the second data is received at the first user equipment via a second device-to-device communication link from a third user equipment.

7. The method of claim 5, comprising:
    transmitting, via the device-to-device communication link to the second user equipment, the second data, wherein the second data comprises routing information having a path for transmission of the second data; and
    based on the routing information, causing the second user equipment to send the second data to the first base station, the second base station, or both.

8. A non-transitory, computer-readable medium comprising instructions, that when executed by processing circuitry, cause the processing circuitry to:
    receive a request for data from a target user equipment;
    receive a first data set associated with the data from a first base station;
    receive a second data set associated with the data from a second base station;
    assemble the data based at least in part on the first data set and the second data set; and transmit the data to the target user equipment, the target user equipment being disconnected from the first base station, the second base station, or both.

9. The non-transitory, computer-readable medium of claim 8, wherein the instructions, when executed, cause the processing circuitry to:
receive a third data set associated with the data from a first user equipment; and
assemble the data based at least in part on the first data set, the second data set, and the third data set.

10. The non-transitory, computer-readable medium of claim 9, wherein the instructions, when executed, cause the processing circuitry to:
transmit the first data set, the second data set, the data, or any combination thereof to the first user equipment; and
cause the first user equipment to send the data to the target user equipment.

11. The non-transitory, computer-readable medium of claim 10, wherein the instructions, when executed, cause the processing circuitry to cause the first user equipment to assemble the data based at least in part on the first data set, the second data set, and the third data set.

12. The non-transitory, computer-readable medium of claim 8, wherein the instructions, when executed, cause the processing circuitry to:
receive second data; and
transmit a data set associated with the second data to a first user equipment.

13. The non-transitory, computer-readable medium of claim 12, wherein the instructions, when executed, cause the processing circuitry to cause the first user equipment to send the data set associated with the second data to the first base station, the second base station, or both.

14. The non-transitory, computer-readable medium of claim 12, wherein the instructions, when executed, cause the processing circuitry to transmit the second data to the first user equipment, wherein the second data comprises routing information having a path for transmission of the second data.

15. The non-transitory, computer-readable medium of claim 14, wherein the instructions, when executed, cause the processing circuitry to cause the first user equipment to send the second data to the first base station, the second base station, or both, based on the routing information.

16. A first user equipment comprising:
a transmitter;
a receiver;
a processor coupled to the transmitter and receiver, the processor configured to:
cause the receiver to receive a request for data from a target user equipment, wherein a group of user equipments comprises the first user equipment and the target user equipment;
cause the receiver to receive a first data set associated with the data from a first base station;
cause the receiver to receive a second data set associated with the data from a second base station;
assemble the data based at least in part on the first data set and the second data set; and
cause the transmitter to transmit the data, or any combination to the target user equipment, the target user equipment being disconnected from the first base station, the second base station, or both.

17. The first user equipment of claim 16, wherein the processor is configured to:
cause the receiver to receive a third data set associated with the data from a second user equipment; and
assemble the data based at least in part on the first data set, the second data set, and the third data set.

18. The first user equipment of claim 17, wherein the group of user equipments comprises the second user equipment.

19. The first user equipment of claim 16, wherein the processor is configured to transmit the first data set, the second data set, the data, or any combination thereof to a second user equipment.

20. The first user equipment of claim 19, wherein the processor is configured to cause the second user equipment to send the data to the target user equipment.

* * * * *

UNITED STATES PATENT AND TRADEMARK OFFICE
CERTIFICATE OF CORRECTION

Page 1 of 1

PATENT NO. : 12,317,294 B2
APPLICATION NO. : 17/880613
DATED : May 27, 2025
INVENTOR(S) : Sharad Sambhwani et al.

It is certified that error appears in the above-identified patent and that said Letters Patent is hereby corrected as shown below:

In the Claims

Column 40, Claim 1, Line 8, please insert the words --the data-- between "equipment" and "to".

Signed and Sealed this
Sixteenth Day of September, 2025

Coke Morgan Stewart
*Acting Director of the United States Patent and Trademark Office*